(12) United States Patent
Mayer et al.

(10) Patent No.: US 11,358,343 B2
(45) Date of Patent: Jun. 14, 2022

(54) BONDING OBJECTS TOGETHER

(71) Applicant: MultiMaterial-Welding AG, Stansstad (CH)

(72) Inventors: Jörg Mayer, Niederlenz (CH); Mario Lehmann, Les Pommerats (CH); Martin Rhême, Belfaux (CH)

(73) Assignee: MULTIMATERIAL-WELDING AG, Biel/Bienne (CH)

(*) Notice: Subject to any disclaimer, the term of this patent is extended or adjusted under 35 U.S.C. 154(b) by 167 days.

(21) Appl. No.: 16/476,573

(22) PCT Filed: Jan. 9, 2018

(86) PCT No.: PCT/EP2018/050464
§ 371 (c)(1),
(2) Date: Jul. 9, 2019

(87) PCT Pub. No.: WO2018/130524
PCT Pub. Date: Jul. 19, 2018

(65) Prior Publication Data
US 2020/0353696 A1    Nov. 12, 2020

(30) Foreign Application Priority Data

Jan. 11, 2017 (CH) ..................................... 00035/17

(51) Int. Cl.
| | | |
|---|---|---|
| *B29C 65/00* | (2006.01) | |
| *B29C 65/06* | (2006.01) | |
| *B29C 65/08* | (2006.01) | |
| *B29C 65/48* | (2006.01) | |
| *B29C 65/56* | (2006.01) | |

(Continued)

(52) U.S. Cl.
CPC ........ *B29C 66/30341* (2013.01); *B29C 65/06* (2013.01); *B29C 65/08* (2013.01);
(Continued)

(58) Field of Classification Search
CPC ..... B29C 35/0261; B29C 65/06; B29C 65/08; B29C 65/48; B29C 65/645; B29C 65/72;
(Continued)

(56) References Cited

U.S. PATENT DOCUMENTS

| | | | |
|---|---|---|---|
| 3,440,117 A | 4/1969 | Soloff et al. | |
| 3,523,845 A | 8/1970 | Robertson | |

(Continued)

FOREIGN PATENT DOCUMENTS

| | | |
|---|---|---|
| CN | 102668726 | 9/2012 |
| DE | 28 46 181 | 5/1980 |

(Continued)

OTHER PUBLICATIONS

International Preliminary Report on Patentability dated Jul. 16, 2019 (dated Jul. 16, 2019), Application No. PCT/EP2018/050464, 8 pages.

(Continued)

*Primary Examiner* — Philip C Tucker
*Assistant Examiner* — Brian R Slawski
(74) *Attorney, Agent, or Firm* — Rankin, Hill & Clark LLP

(57) ABSTRACT

A method of bonding a first object to a second object, including the steps of: providing a profile body having a first profile body portion; providing the first object, wherein the first object has thermoplastic material; providing the second object, wherein the profile body is separate from and attachable to the second object or wherein the second object includes the profile body; embedding the profile body in the first object such that the first profile body portion is within the thermoplastic material of the first object. Embedding the profile body in the first object is caused by mechanical (Continued)

energy impinging on the first object and/or on the second object while the first object and the second object are pressed against each other.

15 Claims, 11 Drawing Sheets

(51) Int. Cl.
    *B29C 65/64*     (2006.01)
    *B29C 65/78*     (2006.01)
    *F16B 11/00*     (2006.01)
    *B29L 31/30*     (2006.01)

(52) U.S. Cl.
    CPC ............ *B29C 65/48* (2013.01); *B29C 65/564* (2013.01); *B29C 65/645* (2013.01); *B29C 65/7826* (2013.01); *B29C 66/41* (2013.01); *B29C 66/712* (2013.01); *B29C 66/7392* (2013.01); *B29C 66/73112* (2013.01); *B29C 66/73921* (2013.01); *F16B 11/002* (2013.01); *F16B 11/006* (2013.01); *B29L 2031/30* (2013.01); *B29L 2031/3076* (2013.01)

(58) Field of Classification Search
    CPC . B29C 65/7826; B29C 66/1122; B29C 66/21; B29C 66/30341; B29C 66/322; B29C 66/41; B29C 66/45; B29C 66/472; B29C 66/712; B29C 66/7312; B29C 66/7392; B29C 66/73921; B29C 66/8322; B29C 66/9513; B29C 66/9517; B29L 2031/30; B29L 2031/3076; F16B 11/002; F16B 11/006; F16B 15/0007; F16B 5/0096; F16B 5/07
    USPC ... 156/60, 73.1, 73.6, 91, 92, 196, 219, 290, 156/292, 297, 298, 300, 303.1, 308.2, 156/308.4, 309.6
    See application file for complete search history.

(56) References Cited

U.S. PATENT DOCUMENTS

| | | | | |
|---|---|---|---|---|
| 3,765,973 | A | * | 10/1973 | Kramer ............... B29C 66/3024 156/73.1 |
| 3,874,963 | A | * | 4/1975 | Barger ................ B29C 65/3468 156/73.2 |
| 4,106,962 | A | | 8/1978 | Adams et al. |
| 4,326,902 | A | * | 4/1982 | Peddie .................... B29C 65/08 156/290 |
| 4,358,328 | A | | 11/1982 | Pearson |
| 4,679,367 | A | | 7/1987 | Geisthardt |
| 5,980,665 | A | * | 11/1999 | Childress .............. B29C 66/721 156/92 |
| 6,913,666 | B1 | * | 7/2005 | Aeschlimann .......... B29C 65/56 156/73.1 |
| 2009/0104399 | A1 | * | 4/2009 | Field ..................... B29C 66/114 428/119 |
| 2010/0068464 | A1 | * | 3/2010 | Meyer ................ B23K 15/0086 428/161 |
| 2013/0287481 | A1 | | 10/2013 | Hardy |
| 2015/0041070 | A1 | * | 2/2015 | Wang ..................... B29C 66/41 156/580 |
| 2016/0177988 | A1 | * | 6/2016 | Silvanus ............. B29C 66/7212 403/270 |
| 2016/0297140 | A1 | * | 10/2016 | Stefanziosa ....... B29C 66/30341 |

FOREIGN PATENT DOCUMENTS

| | | |
|---|---|---|
| DE | 10 2013 001 943 | 3/2014 |
| EP | 3 034 278 | 6/2016 |
| EP | 3 078 480 | 10/2016 |
| JP | 2013-59770 | 4/2013 |
| JP | 2013-148122 | 8/2013 |
| NL | 6512944 | 4/1966 |
| WO | 2015/110311 | 7/2015 |
| WO | 2016/071335 | 5/2016 |
| WO | 2017/055548 | 4/2017 |

OTHER PUBLICATIONS

English translation of Chinese Office Action dated Mar. 24, 2021, Application No. 201880015864.7, 27 pages.

Switzerland Search Report dated Apr. 24, 2017, Application No. CH 352017, 3 pages.

"Hochbelastbare Gewinde-elemente zum Warmeinbetten, Expansionsverankern und Ultraschalleinschweissen", Kunststoffberater, Mar. 1, 1987, vol. 32, No. 3, pp. 57-60, cited in International Search Report.

* cited by examiner

BONDING OBJECTS TOGETHER

The invention is in the fields of mechanical engineering and construction, especially mechanical construction, for example automotive engineering.

In the automotive, aviation and other industries, due to new manufacturing techniques and new materials as well as the constant need for increased efficiency, methods of bonding objects together remain a challenge. For example, the materials of the objects to be bond do not or poorly weld and state of the art bonding technics are often time-consuming (e.g. when using an adhesive) or effect adversely the structural stability of the objects to be bound, e.g. by introducing stress and/or weaken the objects.

WO 2015/110311 A1 discloses a method for joining fiber-reinforced joining elements, formed from a plastic material, by means of an ultrasonic welding method. It addresses the problem of low stability of the joining location caused by joining locations that are not penetrated by the fibers. According to the teaching of WO 2015/110311 A1, said problem is solved by arranging a concentrator and/or insertion element in the region of the joining surfaces prior to fusing.

Further, the visual impression of an element after bonding is getting increased importance as it is an indication for good processing and high quality, for example.

However, an improvement of the visual impression should not be realized at the expense of the reliability of the bond established.

It is an object of the present invention to provide approaches for bonding objects together, especially for bonding a first object to a second object.

In particular, it is an object to overcome drawbacks of the state of the art, for example drawbacks related to materials that cannot be weld in the desired manner, poor handling stability, and the generation of stress or negative effects on the structural stability of the objects. In particular, it is an object to provide a bonding method and related profile bodies that allow for a high bonding stability with low penetration depth of the profile bodies into the objects.

It is a further object to provide approaches for bonding objects together in a manner that the visual impression of surfaces visible after bonding is not affected by the bonding process.

In particular, it is an object of the invention to provide approaches for bonding a first object to a second object in a manner that so little stress is induced that a surface of the first or second object that is visible after bonding of the two objects is not deformed and that it does not deform during use of the bonded first and second objects.

In accordance with the invention, a method of bonding a first object to a second object is provided, wherein the first and second objects may have abutting surface portions that locally are to lie flattishly against each other, and the second object for example has a complex surface shape. In such situations, in accordance with the prior art, an adhesive bond is used for the fastening. However, adhesive bonds have certain limitations.

The invention provides an alternative solution. In accordance with the invention, a plurality of profile bodies of a not liquefiable material is used as connecting elements between a first object and a second object. The profile bodies may especially be metallic and/or may be bendable. The profile bodies can be separate parts, in particular they can be separate from the first and second object, or the second object can comprise the profile bodies. The profile bodies can be attachable to the first and/or second object. At least the first object comprises thermoplastic material. The method comprises embedding the profile bodies in the first object such that a first profile body portion is within thermoplastic material of the first object, wherein embedding of the profile bodies in the first object is caused by mechanical energy impinging on the first object and/or on the second object while the first object and the second object are pressed against each other.

The thermoplastic material of the first object is capable of being made flowable by absorption of the mechanical energy while the objects are pressed against each other. The mechanical vibration energy is coupled through the first and/or second object to the interface with the profile body and may be further coupled through the profile body to the interface with the second/first object, respectively. At the corresponding interface, external and possibly also internal friction will cause thermoplastic material to heat and become flowable, whereupon the profile body due to the pressure applied will be pressed into the material and become embedded thereby. The structure of the profile body having a profile in this may serve as energy director, i.e. the energy absorption and heat generation will automatically be focused on the respective interface.

Especially, the profile bodies may be shaped to be undercut with respect to a proximodistal axis (i.e. an axis along which the first and second objects are pressed against each other, also called "axis" in this text). The undercut can be formed by a structure adapted to form a positive fit connection with thermoplastic material of the first and—as the case may be—the second object. In addition or as an alternative, the undercut can be formed by an overall shape of the profile body portion to be embedded, for example by an opening of the profile body portion that has a diameter that changes along the direction of embedment.

Therefore, the method according to the invention comprises the steps of:
  Providing a plurality of profile bodies. For example 2, 3 4 or more profile bodies can be provided. Each profile body comprises a first profile body portion. The first profile body portion can comprise the proximal or distal end of the profile body, for example.
  Providing the first object, wherein the first object comprises thermoplastic material in a solid state. For example, the first object can comprise a thermoplastic body with a surface made of an alloy or metal.
  Providing the second object, wherein the profile bodies are separate from and attachable to the second object or wherein the second object comprises the profile bodies. In the case of profile bodies that are separate from the second object, the profile bodies can be equipped for being anchored in the second object.
  Embedding the profile bodies in the first object such that each first profile body portion is within the thermoplastic material of the first object.

In addition, the method comprises the step of attaching the profile bodies to the second object in embodiments in which the profile bodies are separate from and attachable to the second object. For example, each profile body can comprise a second profile body portion and the profile bodies are attached to the second object via their second profile body portion.

The first profile body portion and the second profile body portion do not need to be oriented along the same axis. Rather, a longitudinal axis of the first profile body portion (also called first axis in the following) can be offset to a longitudinal axis of the second profile body portion (also called second axis in the following).

The second object can comprise a thermoplastic material and the profile bodies can be attached to the second object by embedding the profile bodies in the second object such that the second profile body portions are within the thermoplastic material of the second object.

The thermoplastic material of the second object can be different from the thermoplastic material of the first object.

Embedding of the profile bodies in the first object—and in the second object as the case may be—is caused by mechanical energy impinging on the first object and/or on the second object while the first object and the second object are pressed against each other.

The step of pressing may be carried out until the abutting surface portions of the first and second objects lie against each other, with the profile body embedded in the material of the first object and attached to the second object.

It is an insight of the invention that the method allows bonding of the first object to the second object even in cases in which the first and second object in total or at their bonding locations are made of materials with properties that vary widely. In particular, they can vary in their properties such that welding and/or the use of an adhesive is not possible or leads to an insufficient mechanical stability of the bond.

It is a further insight of the invention that the method allows the bonding of the first object to the second object, for example in cases where the properties of the materials of the first and second objects vary widely, with low penetration depth into the first and/or second object. This is important because any penetration of a connecting element effects the stability of the object adversely and said effect depends on the penetration depth.

For example, the first object can be a composite comprising the thermoplastic material, such as a laminate or a fiber-reinforced composite. However, the first object can also be a foil.

The second object can be a composite. For example, it can be a laminate, a fiber-reinforced composite or a hollow core board.

At least one profile body, in particular each profile body, can comprise a plurality of first profile body portions. In other words, each profile body can comprise a plurality of locations that are embedded in the first object and that bond the profile body to the first object.

In addition, each profile body can comprise one or more than one (i.e. a plurality of) second profile body portions. In other words, each profile body can comprise a plurality of locations at which the first object attaches to the second object, for example by embedment of the second profile body portions in the second object.

The first profile body portion(s) and the second profile body portion(s) (if present) can be designed in a manner to effect the stability of the first and—as the case may be—the second object as little as possible. In particular, the first profile body portion(s) can have a length along the first axis that is smaller than 5 mm, in particular smaller than 3 mm or 2 mm. For example, said length can be between 0.1 mm and 2 mm, such as around 0.8 mm, 1 mm, 1.2 mm, 1.4 mm, 1.5 mm, 1.6 mm or 1.8 mm.

It is a further insight of the invention that a reliable bonding between the first and second object, in particular a reliable bonding with respect to a pulling force applied on the first and/or second object, said pulling force generating a significant force component along the axis of the profile body, can be achieved with the length along the first axis being between 0.2 mm and 0.5 mm.

In embodiments comprising profile body portions that form the undercut by an opening and a cavity having a diameter that increases along the direction of embedment, wherein its minimal diameter is a diameter of the opening, the resistance against the pulling force depends in the first instance on the minimal diameter, the maximal diameter (the diameter at the bottom of the cavity, for example) and the design of the cavity, this means the way the cavity transforms from the minimal to the maximal diameter. Details concerning the relation between the reliability of the bonding and the design are given in WO 2017/055 548 A1, in particular in FIGS. 1b, 46, 47 and the corresponding description. WO 2017/055 548 A1 is incorporated by reference.

Generally, an increase in the minimal diameter is advantageous in terms of resistance against the pulling force.

It has been found that designs of the profile body portions having a ratio between length (height) and minimal diameter, said ratio being smaller than 1, in particular between 0.1 and 0.5, leads to good results in terms of reliable bonding.

One can envisage to increase the length (height) of the profile body portions in order to increase the reliability of the bonding against shear forces.

However, good overall reliability has been observed with profile body portions having a length (height) between 0.3-2 mm and a minimal diameter between 1-10 mm, in particular a length between 0.5 mm and 1 mm and a minimal diameter between 2 mm and 3 mm.

Each profile body can comprise a base element from which the first profile body portion(s) and—as the case may be—the second profile body portion(s) protrude.

In particular, the element forming the support surface as discussed later in detail is the base element.

The base element can form at least one support surface.

The profile body can comprise a support surface that is not formed by the base element.

For example, the base element can have the shape of a plate that is adapted to the shape of a first object surface portion in which the profile body is embedded and a second object surface portion to which the profile body is attached.

If the profile body is made of a metal sheet, the profile body portions can be formed by deforming the metal sheet. In particular, non-deformed portions of the metal sheet can form the base element. For example, the profile body portions can be formed by punching (stamping) the metal sheet.

In embodiments, the base element is a plate that can be planar or non-planar and that has a first surface and a second surface, wherein the first profile body portion(s) protrude from the first surface and the second profile body portion(s) protrude from the second surface. The second surface can be opposite of the first surface.

For example, the first profile body portion(s) and the second profile body portion(s) can be arranged in pair(s) on the base element such that the first and second body portions of a pair are arranged at the same location but on opposite sides of the base plate. Alternatively, the location(s) of the first profile body portion(s) on the first surface of the base element is offset from the location(s) of the second profile body portion(s) on the second surface of the base element. This arrangement of first and second profile body portions is advantageous in terms of the production of the profile body. Profile bodies with such an arrangement of profile body portions can be produced by punching (stamping) the base element.

At least one profile body (3) includes at least two first profile body portions (3.1) and the step of embedding the profile bodies (3) in the first object (1) includes embedding the at least two first profile body portions (3.1) in the thermoplastic material of the first object (1). The profile bodies (3) are separate from the second object (2) and include at least one second profile body portion. The second object (2) includes thermoplastic material, and the profile bodies (3) are attached to the second object (2) by the method including the step of embedding the at least one second profile body portion (3.2) in the thermoplastic material of the second object (2). At least the at least one profile body (3) includes a base element (34) from which the at least two profile body portions (3.1) and the at least one second profile body portion (3.2) protrude.

In an embodiment, the method comprises the further step of providing an adhesive.

It is an insight of the invention that the bonding method comprising the embedment of profile bodies is particularly advantageous for materials of the first and second object that need or are intended to be bonded to each other by an adhesive. Adhesive bonding methods often have such a poor stability at the beginning of the bonding procedure that the objects either need to rest for a while or that the objects need to be equipped with undesired features in shape for mechanically blocking a relative movement of the objects to be bond.

It has been found that the method according to the invention leads to a reduction of the time for which the bonded objects need to rest when using an adhesive. In other words, the method according to the invention leads to a reduction of the time for establishing a handling stability, at least.

At least one of the shape of the first object, the second object and the profile bodies can be such that an adhesive gap, this means space for the adhesive, is generated between the first and second object surface portion during the method.

Hence, the step of providing an adhesive can comprise the sub-step of providing an adhesive gap.

The adhesive gap can be generated passively by a spacer element and/or actively by distance control during the method.

For example, the first object can comprise a first object recess being arranged at the same side of the first object as the first object surface portion and/or the second object can comprise a second object recess being arranged at the same side of the second object as the second object surface portion.

Alternatively or in addition, the base element can have a thickness such that the first and second object do not abut after bonding but are separated by the adhesive gap. In particular, first and second object do not abut in a region next to the profile body.

For example, the thickness of the base element can be smaller than 5 mm, in particular smaller than 3 mm or 2 mm. In particular, the thickness is around 1 mm and 1.5 mm. In applications in which there is no need for an adhesive gap for example, the thickness can be below 1 mm, for example 0.3 mm or 0.5 mm. The thickness can be given by the thickness of the metal sheet forming the base element.

Alternatively or in addition, the adhesive gap can be formed by applying a pre-defined pressure during the step of embedding and by designing the profile bodies and optionally the adhesive such that a resistance against closing the gap between the first and second object during the method is generated, said resistance increases with decreasing gap. Optionally, the profile bodies can be designed such that said resistance increase in a step at a given gap (distance) between the first and second object. For example, the profile bodies can comprise support surfaces as discussed later.

In various embodiments, the first object, the second object and/or the profile bodies are designed such that an adhesive gap is between 0.1 mm and 2 cm is established, in particular between 0.2 mm and 0.5 cm, for example between 0.2 and 2 mm.

In an embodiment, the method comprises the step of establishing a seal.

The step of establishing a seal can comprise providing a sealing element, such as a sealing band or a sealing ring, and positioning the sealing element relative to the first object, the second object and the profile bodies. In particular, the sealing element is positioned prior to the step of embedding the profile bodies.

The step of establishing a seal can comprise providing a first object comprising an elastomeric portion that is arranged at and protrudes from the same side of the first object as the first object surface portion or providing a second object comprising an elastomeric portion that is arranged at and protrudes from the same side of the second object as the second object surface portion.

In particular, the elastomeric portion is arranged such that it is compressed between the first and second object during the method.

The step of establishing a seal can be in addition to the step of providing an adhesive and related sub-steps.

The sealing element or elastomeric portion can contribute to the formation of the adhesive gap.

It has been found that the method according to the invention can be used for establishing a sealed bonding of the first object to the second object without increasing processing time and/or complicating the bonding process. This is because the profile bodies fix the position of the first object relative to the second object shortly after applying the mechanical energy causing the thermoplastic material to become flowable. Bonding methods based on adhesives and also welding cannot support the needed compressing force before the adhesive or weld is hardened. In contrast to such methods, the method according to the invention provides a relative fixation that can support said compressing force shortly after assembling the first and second object.

Embodiments of the method can distinguish by the profile bodies provided. Said profile bodies can differ in any feature disclosed. In particular, they can differ in their elastical deformability, in the means for determining a maximal penetration depth and/or generating an adhesive gap.

In particular, the profile bodies are designed in a manner that each first profile body portion is embedded in an area of the first object that is small compared to the area of the first object that faces the second object during bonding. In other words, the profile bodies are designed to form localized.

Examples of profile bodies designed in this manner are described below. In particular, profile bodies can be used that comprise at least one first profile body portion that has a cross-section perpendicular to a direction of embedding that forms for example a closed loop or an open loop comprising at least two ends that are bent towards each other, such as an open ring or a spiral. Such profile bodies are in particular advantageous if they comprise in a manner that the embedding of the profile body sets in at the first opening. The first opening can be an opening to a cavity formed by the profile body.

In many embodiments, the first opening is the proximal or distal end of the profile body—depending on the relative arrangement (in particular the stacking sequence) and orientation of the first object, the second object and the profile body.

If the profile bodies comprise at least one second profile body portion that is attached to or embedded in the second object, the above can apply for each of the second profile body portions.

A design of the profile bodies that leads to embedding of the first profile body portions in small, i.e. located, areas of the first object and—as the case may be—to attaching or embedding the second profile body portions in small, i.e. located, areas of the second object are advantageous over profile bodies that are embedded in areas of the first and—as the case may be—second object that are large, i.e. extending and/or non-located, areas. "Large" also means that said area extends over a significant area of the surface of the first (second) object that faces the second (first) object during bonding.

A further advantage of localized bonding locations is that the bonding locations can be arranged in a manner optimized for the shapes of the first and second objects.

Another advantage is that the bonding locations can be optimized in terms of stress induced in the first and eventually second object, in particular during bonding. Further, the overall stress induced by localized bonding locations is smaller than by extending bonding locations, Finally, measures for further stress reduction, such as stress release structures, reservoirs, compensation regions and/or elastic deformability as described below, are often advantageously realized in combination with localized bonding locations.

In particular, a method according to the invention comprises the following configurations between profile bodies, first object, and second object, at least:

The profile bodies provided initially are separate from each other and separate from the second (and first) object.

The profile bodies are comprised by the second object, wherein the second object can be made of or comprise a thermoplastic material or wherein the second object does not comprise any thermoplastic material. For example, the second object can be made of an alloy, a metal or a composite. However the second object can comprise a thermoplastic body with a surface made of an alloy or metal.

At least one of the first and second object can comprise a surface that is visible after bonding of the first and second object, for example a so-called A-surface.

In an embodiment of the method, the profile bodies provided are separate profile bodies except a possible connection via the second object. However, the profile bodies provided can be completely separate, i.e. separate from each other and from the first and second object.

In particular, the profile bodies provided initially do neither form nor are they part of a further continuous object other than the second object.

Especially, generally in embodiments, the profile bodies may be of a different material than the second object. For example the profile bodies may be metallic or of a comparably hard plastic, and the second object may comprise, at least in a region that has the surface portion that comes into contact with the first object ('second object surface portion' in this text) a thermoplastic material. In embodiments in which the profile bodies are of a different material than the second object, the assembly of the second object with the profile bodies does not comprise any portion of the profile body material that connects the profile bodies.

In embodiments, the second object has a generally flat second object surface portion with the first profile body portions protruding from the second object surface portion, especially first profile body portions undercut with respect to the axis (which will generally be perpendicular to the second object surface portion).

In another embodiment of the method, the step of providing the second object comprises providing the second object with the profile bodies comprised. In particular, the profile bodies are integral with the second object.

In embodiments, in which the second object comprises the profile bodies, the second object can be made by injection moulding, for example with the second objects being placed in a mould and remaining parts of the second object being injection moulded around the second profile body portions.

However, the second object can also be processed before the step of providing the second object such that it comprises the profile bodies.

As pointed out above, it is an object of the invention to provide approaches for bonding the first object to the second object in a manner that so little stress is induced that a surface of the first or second object that is visible after bonding of the two objects is not deformed and that it does not deform during use of the bonded first and second objects.

It is an insight of the invention that the use of a plurality of profile bodies that are not connected to each other or connected via the first or second object at the beginning of the bonding only, and that are connected via the first or second object after the bonding only reduces the stress induced in the object during bonding and after bonding significantly. This is a surprising finding, given the fact that the bonding takes place very locally, only. In particular, one would expect an increase in stress at the local bonding position and hence a negative influence on nearby surfaces, for example.

Stress in the first and/or second object after bonding results for example from external influences, such as changing temperature and/or changing humidity.

Further, the use of said plurality of profile bodies pave the way for further stress reduction. Further stress reduction can be realized by at least one of:

The profile bodies being configured to deform elastically in reaction to a tension generated by a movement of the first object relative to the second object. Said movement can be the result of, for example different, external influences on the first and second object and/or of the effects of such influences. Said effects can depend on the characteristics of the material or materials that form the first object and the material or materials that form the second object.

In particular, the profile bodies are configured to deform elastically along a direction that is parallel to the first object surface portion and the second object surface portion lying against each other (i.e. along a direction that is perpendicular to a (longitudinal) axis of the profile body). In addition, the profile bodies can be shaped to be rigid, i.e. non deformable by any force acting along an axial direction. In other words, the profile bodies may be shaped so that the mechanical resistance against deformation in-plane is substantially (for example by at least an order of magnitude) smaller than mechanical resistance against axial deformation For example, the profile bodies may have an open shape in a section perpendicular to the axis (being normal to the first object surface portion and the second object surface portion lying against each other). The shape of an open circle or a spiral-like shape in the section perpendicular to the axis are examples of such open shapes.

However, the profile bodies can also have the shape of a wave in a section perpendicular to the axis that is normal to the first object surface portion and the second object surface portion lying against each other or said axis can be a rotational axis of each profile body. In particular, the profile bodies can be symmetric under a rotation of 120 or 90 degrees.

In addition or alternatively to an elastical deformability of the profile bodies given by their shape, the profile bodies can be hollow, for example by comprising an opening that extends along the axis normal to the first object surface portion and the second object surface portion lying against each other. The thickness of the walls of the hollow profile bodies can be such that the walls do not hinder a deformation of the profile bodies when said tension applies. In particular, the profile bodies can be made of a metal sheet.

The first and/or second object comprises a stress release structure, wherein said stress release structure is equipped for reducing stress internal to the object that comprises the stress release structure. Especially, the stress release structure may be a structure configured to compensate for different dilatation in the plane perpendicular to the axis. For example, the stress release structure may be a portion of the second object or first object, respectively, the in-plane dimension of which is adaptable by applying a relatively small in-plane force.

For example, the stress release structure may be a region of the object that is thinner (along the axis that is normal to the object surface portion that lies against the other object when the first and second object are bonded) than other regions of the object. The other regions of the objects can comprise the regions where the profile bodies are embedded or attached. In other words: The position of the stress release structure can be distinct from locations of the profile bodies.

In addition or as an alternative, the stress release structure can be shaped to promote stress release. For example, the stress release structure can be a portion of the object that is waved or narrowed.

A reservoir in at least one of the first object and the second object or formed by at least one of the first object and the second object. Said reservoir can be formed by a recess or indentation on the side of the object that is bonded to the other object, for example.

The reservoir is arranged such that thermoplastic material that is displaced during the step of embedding the profile bodies in the first object or during the step of embedding the profile bodies in the first object and in the second object is accommodated in the reservoir.

In particular, the reservoir is arranged such that it comprise or at least surrounds part of a profile body.

In most embodiments, the number of reservoirs is adapted to the number of profile bodies.

Such reservoirs have the effect that no thermoplastic material, in particular no liquefied thermoplastic material, that is displaced during embedding gets between the first object surface portion and the second object surface portion lying against each other. Hence, there are no pressure marks generated that can result from such displacements. In other words: There is significantly less stress induced in the first and second object during bonding.

In embodiments comprising the at least one reservoir, the method can comprise the further step of positioning a profile body relative to each reservoir such that thermoplastic material displaced during embedding can enter the reservoir(s).

At least one of the first object can comprise a first surface opening in the first object surface portion and the second object can comprise a second surface opening in the second object surface portion.

The first surface opening or the second surface opening or the first and the second surface opening are designed to accommodate portions of the profile body different form the profile body portion(s), in particular the base element.

Surface opening(s) has/have the effect that portions of the profile body different form the profile body portion(s) do not induce stress in the first and/or second object during and after bonding. Rather, the first and second object can be bonded in a gap-free manner. This means that the first object surface portion is in immediate contact with the second object surface portion after bonding the first and second object. Therefore, any mechanical energy and pressure applied to the first and/or second object after embedding the profile bodies is distributed over abutting first and second object surface portion.

The reservoir can be a portion of a surface opening.

The surface opening(s) can be designed such that it/they take(s) over the functionality of the recess. In particular, the surface opening can have a depths or the surfaces openings can have a cumulated depth that is larger than a maximal thickness of the portions of the profile body to be accommodated in the surface opening(s), this means of the portions of the profile body different form the profile body portion(s).

In an embodiment, the reservoir is combined with the surface opening.

A compensation region in at least one of the first object and the second object that is arranged such that a portion of a profile body embedded in the first object and attached to the second object can deform without being in contact with material of the first and second object and without getting in contact with material of the first and second object. In particular, the compensation region forms an open space around said portion of the profile body.

The open space defines a free path length of the profile body. Said free path length in combination with deformation properties of the profile body can define a maximal possible movement of the first object relative to the second object in a direction perpendicular to the axis of the profile body (parallel to the first and second object surface portions).

For example, the profile body can be such that it is able do deform elastically in a direction perpendicular to its axis by 1%, 2%, 3% or 5% of the free path length.

In particular, the profile body can be equipped such that it is rigid, i.e. non deformable elastically, along its axis and elastically deformable in a direction perpendicular to its axis, as pointed out above.

In most embodiments, the number of compensation regions is adapted to the number of profile bodies.

In embodiments comprising the at least one compensation region, the method can comprise the further step of positioning a profile body relative to each compensation region such that the compensation region forms a void around the portion of the profile body after embedding the profile body in the first object or after embedding the profile body in the first object and attaching the profile body to the second object.

Such compensation regions have the effect that the first and second object can slide along each other while being bonded to each other in a direction normal to the first object surface portion and the second object surface portion lying against each other with a minimal generation of stress in the first and second object. Hence, the compensation regions are suitable for deformations and movements of the first and second object along the axis parallel to the first object surface portion and the second object surface portion lying against each other In particular, the compensation region is suitable for the compensation of differences in the elasticity and/or in the thermal expansion coefficient of the material(s) forming the first object and the material(s) forming the second object and/or of differences resulting from different exposure of the first and second objects to temperature fluctuations.

Any embodiment of the method can comprise at least one further measure for stress reduction as listed above for example besides the use of a plurality of profile bodies.

In an embodiment, the plurality of profile bodies is embedded simultaneously in the first object during the step of embedding the profile bodies in the first object. In other words: The mechanical energy and the pressure applied to the first and/or second object are such that all profile bodies are exposed to mechanical energy and pressure sufficient for embedding the profile bodies.

Simultaneous embedding of the profile bodies in the first object can be done by a sonotrode comprising a distal coupling face that is adapted to the positions of the profile bodies, for example.

The invention also concerns a profile body for bonding the first object to the second object, in particular for bonding the first object to the second object by carrying out the method in any embodiment.

In a first group of embodiments of the profile body, the profile body comprises an axis and the first profile body portion with a structure adapted to form a positive fit connection, in particular when embedded in the first object, and a first opening. The profile body is further equipped to deform elastically in reaction to a force applying from a direction that is perpendicular to its axis.

In particular, the profile body is equipped to deform elastically along axes perpendicular to its axis.

In a second group of embodiments of the profile body, the profile body comprises the axis and the first profile body portion with the structure adapted to form the positive fit connection, in particular when embedded in the first object, and the first opening. The profile body comprises further a support surface arranged to determine a maximal penetration depth of the profile body, in particular the first profile body portion, in the first object.

Embodiments of the first group can comprise the support surface.

Embodiments of the second group can be equipped to deform elastically in reaction to a force applying from a direction that is perpendicular to its axis. In particular, they can be equipped to deform elastically along axes perpendicular to their axis.

Profile bodies according to the first or second group can comprise one or more of the following features:

The profile body can have an essentially cylindrical shape. In particular, the profile body can be sleeve-like.

The profile body can form a cavity, in particular a cavity that is accessible from the first opening.

The profile body can be made of or comprise a metal or a polymer that is not liquefiable or that is liquefiable only at a substantially higher temperature than both, the materials of the first and second objects.

The profile body can have a shape in a cross-section perpendicular to its axis (i.e. in a plane parallel to the first and second object surface portions after embedding) that corresponds to at least one of a closed loop, as it is the case for a profile body with a cylindrical shape for example, an open loop comprising at least two ends that are bent towards each other, such as an open ring, and an open loop comprising at least two ends that are not bent towards each other. Examples of the latter are shapes that comprise or consist of essentially straight portion(s), corrugated portion(s), curved portion(s) and/or bent portion(s) in said cross-section.

The profile body can have at least one of an essentially straight, step-like, bent, and curved form in a cross-section parallel to its axis (i.e. in a plane perpendicular to the first and second object surface portions after embedding). In particular, said form can be in addition to the support surface which corresponds in embodiments to a portion that extends perpendicular to the axis of the profile body.

The profile body can be made from a metal sheet.

The profile body can be a folded metal sheet with a pattern of openings or a metal sheet with a plurality of partially cut-out and folded portions (tongues), etc.

The profile body can have a second profile body portion with a further structure adapted to form a positive fit connection, in particular when embedded in the second object, and a second opening.

The profile body can comprise the base element.

The first profile body portion can protrude from the base element such that the base element runs essentially parallel to the first object surface portion when the first profile body portion is embedded in the first object.

In addition, the profile body can comprise the second profile body portion.

The second profile body portion can protrude from the base element such that the second profile body portion can be attached to the second object when the first profile body portion is embedded in the first object.

In an embodiment of the profile body comprising the base element, the profile body can comprises at least three profile body portions, for example a plurality of first profile body portions, this means profile body portions arranged on the base element to be embedded in the first object, and a plurality of second profile body portions, this means profile body portions arranged on the base element to be embedded in the second object.

In any embodiment comprising the base element, the base element can comprise the stress release structure and/or the reservoir in any embodiment described above with respect to the first and/or second object.

Both, the first and the second profile body portions can be arranged along the axis. However, the first and the second profile body portions can be arranged at an angle relative to each other. In particular at the normal angle.

The axis of the profile body according to the first and/or second embodiment of the profile body can be a first axis, wherein the first axis is an axis of the first profile body portion.

The profile body can comprise the second profile body portion and a second axis, wherein the second axis is an axis of the second profile body portion.

Embodiments of the profile bodies can distinguish by the relative orientation of the first and second axis.

For example, first and second axis can run perpendicular to a plane defined by the base element and be offset to each other. In other words, the first and second axis do not coincide but are parallel to each other. In particular, first and second profile body portion can be arranged on opposite sides of said plane.

However, one can also envisage embodiments in which the first axis runs at an angle to the second axis. In particular, this is the case when the portion of the first object surface in which the first profile body portion is embedded is or should not be parallel to the portion of the second object surface to which the second profile body portion is attached.

The structure of the first and/or second profile body portion adapted to form a positive fit connection can be at least one of an undercut, a hole, and a twist.

In embodiments, the profile body has an aspect ratio (i.e. ratio between the extension in its axial direction compared to the extensions in radial directions with respect to its axis) that is smaller than 2, in particular smaller than 1.

In an embodiment of the method, the profile bodies provided are dimensioned such that at least one of a first depth to which the profile bodies extend in the first object when embedded in the first object is smaller than a thickness of the first object and of a second depth to which the profile bodies extend in the second object when attached to the second object is smaller than a thickness of the second object. The thickness of the first object and the thickness of the second object are the according extension of the objects along a direction normal to the object surface that lies against the other object after bonding.

In particular, at least one surface of first or second object is not penetrated by any profile body after bonding. The A-surface is one of this at least one surface.

The profile bodies have a profile that defines a structure adapted to form a positive fit connection with the thermoplastic material of the first object.

The profile of the profile bodies can comprise a further structure adapted to form a positive fit connection with a material of the second object.

In embodiments comprising profile bodies having a profile that defines said structure, the step of embedding the profile bodies in the first object comprises embedding the structure equipped to form a positive fit connection in the thermoplastic material of the first object.

In embodiments comprising profile bodies having a profile that defines said further structure, the method can comprise a step of attaching the profile bodies to the second object by forming a positive fit connection the second object. Said step of attaching can be embedding the further structure equipped to form a positive fit connection in thermoplastic material of the second object. However, said step of attaching can also comprise the generation of a positive fit connection by engaging the further structure with a corresponding structure of the second object.

The structure adapted to form a positive fit connection and optionally the further structure adapted to form a positive fit connection especially may be a structure that is undercut with respect to axial directions. Examples thereof comprise radially at least one extending protrusion or indentation, a twist, a hole, etc.

Especially in embodiments both, the first profile body and the second profile body are each undercut with respect to axial directions, whereby after the process the profile bodies are secured both, to the first and second objects by a positive-fit connection.

In embodiments the undercut defining profile of the profile body is constituted by portions of a metal sheet appropriately folded, deformed, or may be constituted by a cast body (such as die cast), etc.

The structure adapted to form a positive fit connection and optionally the further structure interpenetrated by material of the first/second material secure, after re-solidification, the resulting arrangement against pulling the first/second objects apart (in out-of-plane directions relative to the surface portions around the location where each profile body is embedded; this out-of-plane axis is also called 'proximo-distal' axis in this text).

In a group of embodiments, the second object comprises a thermoplastic material, too.

In this group of embodiments, the profile bodies are initially separate from the second object and are attached to the second object by the method comprising the further step of embedding the profile bodies in the second object such that a second profile body portion is within the thermoplastic material of the second object.

The profile bodies can have a further structure adapted to form a positive fit connection with the thermoplastic material of the second object that is identical to one of the possible structures adapted to form a positive fit connection with the thermoplastic material of the first object.

Embedding of the profile bodies in the second object is caused by mechanical energy impinging on the first object and/or on the second object while the first object and the second object are pressed against each other.

The embedding of the profile bodies in the second object can be done in the step of embedding the profile bodies in the first object, i.e. simultaneously, or in a separate step, for example sequentially, one after the other.

In a sub-group of embodiments in which the second object comprises thermoplastic material too, the method is carried out such that the first and second profile body portions are essentially simultaneously embedded in the thermoplastic materials of both objects, i.e. by the effect of the energy thermoplastic material portions of both objects start becoming flowable at a same stage. To this end, the material composition of the first and second objects and/or the shapes of the profile body portions, may be slightly different to compensate for the fact that without such measures the energy absorption could be higher at the interface between the profile body portion and that one of the objects into which the mechanical vibration energy is coupled.

In the sub-group of embodiments in which the second object comprises thermoplastic material too, at least one of the profile bodies, the first object and the second object can be designed such that the first and second profile body portions are essentially simultaneously or sequentially embedded in the thermoplastic materials of the objects.

The time embedment of a profile body portion sets in depends on the melting properties of the thermoplastic material and the energy density coupled into the thermoplastic material. If the energy causing liquefaction of the thermoplastic materials is applied to the first or second object, one needs to consider that the energy applied is not only damped by the object to which it is applied but also by the profile body if the embedment concerns a profile body portion that is arranged distally of the profile body with respect to the object to which the energy is applied. Hence, embedding the first profile body portion in the thermoplastic material of the first object and the second profile body portion in the thermoplastic material of the second object is sequential if the thermoplastic materials are identical and the first profile body portion is identical to the second profile body portion.

The time at which the second profile body portion is embedded relative to the time the first profile body portion is embedded can be adjusted by providing the first profile body portion with a first area and the second profile body portion with a second area, wherein the first area is designed in a manner that the first profile body portion and/or the profile body is in contact with the thermoplastic materials of the first object via the first area only, wherein the second area is designed in a manner that the second profile body portion and/or the profile body is in contact with the thermoplastic materials of the second object via the second area only, and wherein the first area is smaller or larger than the second area.

In other words, the first profile body portion can comprise the first area and the second profile body portion can comprise the second area wherein the first area differs from the second area in size.

In an embodiment, the profile body portion that is arranged distally of the profile body with respect to the object to which the energy is applied can comprise an area designed in a manner that the distal profile body portion is in contact with the thermoplastic material of the distal object via said area only, said area being smaller than a corresponding area of the proximally arranged profile body portion. This can effect an embedment of the distal profile body portion that is simultaneous with the embedment of the proximal distal profile body portion or even prior to the embedment of the distal profile body portion.

Alternatively or in addition, the time at which the second profile body portion is embedded relative to the time the first profile body portion is embedded can be adjusted by a thermoplastic material of the first object that differs from the thermoplastic material of the second object in the melting properties.

Alternatively or in addition to the areas that differ in size and/or to the thermoplastic materials that differ in their melting properties, at least one of the profile bodies, the first object and the second object can comprise an energy director, this means a variation in shape that defines a point at which liquefaction sets in by causing a high energy density in the energy director and/or in material in contact with the energy director.

Alternatively or in addition to at least one of the areas that differ in size, the thermoplastic materials that differ in their melting properties, and the energy directors the profile body can be able to change at least one of its transmission properties, damping properties, coupling properties, and resistance against embedding during the step of embedding the profile body and/or when exposed to mechanical energy, such as vibrational (in particular ultrasonic) energy, and/or pressure.

Profile bodies that change their transmission and/or damping properties can comprise a region that collapse when exposed to mechanical energy of a predefined characteristics and/or pressure exceeding a predefined value.

An example of a profile body being able to change its coupling properties during the step of embedding the profile body comprises a coupling surface that gets in touch with the object to which the energy is applied during embedding.

In particular, the coupling surface does not cause any liquefaction but it causes an increased coupling of energy from the object to which the energy is applied into the profile body. The support surface and the base element are example of such surfaces. The profile bodies provided can comprise a coupling surface.

An example of a profile body being able to change its resistance against embedding during the step of embedding the profile body comprises a resistance surface that gets in touch with the object to which the energy is applied during embedding or to the object to which the energy is not applied during embedding.

In particular, the resistance surface changes the energy density or pressure distribution at the interface between profile body and object. It can cause a softening of thermoplastic material in contact with the resistance surface. The thermoplastic surface in contact with the resistance surface can be such that a change in coupling properties, in particular an increase in energy coupled into the profile body, is possible nevertheless.

The effect of at least two of the features "areas that differ in size", "energy directors", "different thermoplastic materials", "changing transmission properties", "changing damping properties" "changing coupling properties" and/or "changing resistance against embedding" can be used in a cumulative manner. However, one or more feature can also be used to compensate for an opposite effect caused by one or more of the other features. For example, a more pronounced difference in area sizes can be used to compensate for a mandatory arrangement of thermoplastic materials, e.g. given by the application, and vice versa.

In addition or alternatively, the profile bodies can be designed to prevent an increased embedding in one object at the expense of a decreased embedding in the other object. For example, the profile bodies can comprise the support surface that runs parallel to the first and second object surface and that generates an additional resistance against embedding of the profile body once the first or second object surface is in contact to the support surface.

In a further sub-group of embodiments in which both, the first and second objects comprise thermoplastic material, the method comprise embedding the profile bodies in the material of the first object prior to positioning the first object relative to the second object. For this, for example the mechanical energy, especially vibration energy, may be caused to impinge directly on the profile bodies for embedding the profile body in the first object. This is carried out in a manner that each second profile body portion protrudes from the first object, i.e. is not embedded in the first object. Thereafter, after the thermoplastic material of the first object has re-solidified, the second object is brought into contact with the profile bodies and pressed towards the first object while mechanical vibration energy impinges, for example on the second object.

In yet a further sub-group of embodiments in which both, the first and the second object comprise thermoplastic material, the method may comprise causing a weld between the first and second objects. Especially, the mechanical energy that impinges on the first/second object may be sufficient to make thermoplastic material portions flowable also at the interface between the first and second object, for example next to the profile bodies or in through openings thereof. For the weld, the first and/or second object may comprise an energy directing structure that comes into contact with the other one of the objects when the objects are pressed against each other to embed the profile body.

In embodiments in which the second object comprises thermoplastic material too, the separate profile bodies may be positioned between the initially separate first and second object. The embedding in the second object may then be caused in the same step as the embedding in the first object, i.e. by applying the mechanical vibration and the pressing force, or in a further step comprising applying a pressing force and mechanical vibration. The further step can be before or after the step of embedding the profile bodies in the first object. The pressing force and/or mechanical vibration applied in the further step can be different form the pressing force and/or mechanical vibration applied in the step of embedding the profile bodies in the first object. In particular, the pressing force and mechanical vibration applied in the step of embedding the first object can be adapted to the thermoplastic material of the first object and/or the shape of the first profile body portion. In addition or alternatively, the pressing force and mechanical vibration applied in the further step can be adapted to the thermoplastic material of the second object and/or the shape of the second profile body portion. Therefore, in embodiments in which the second object comprises thermoplastic material too, the method of bonding a first object to a second object, wherein the first and second objects each comprise thermoplastic material in a solid state and each have a surface portion, can comprise:

providing the first and second objects and further providing a plurality of profile bodies, arranging the profile bodies relative to the first and second objects between the surface portions of the first and second objects, wherein the profile bodies comprise a first profile body portion directed towards the first object and a second profile body portion directed towards the second object coupling a pressing force and mechanical vibration energy into at least one of the first and second objects, wherein the pressing force causes the profile body to be clamped between the first and second objects, until a flow portion of thermoplastic material of the first and second objects becomes flowable, until the profile bodies are embedded in the first object such that each first profile body portion is within thermoplastic material of the first object, and until the profile bodies are embedded in the second object such that each second profile body portion is within thermoplastic material of the second object, and letting the thermoplastic material re-solidify.

For example (this is an option for all embodiments), the step of coupling the pressing force and the mechanical vibration into the first/second object may be done by a sonotrode that is pressed against the respective object while the other object may be held directly or indirectly by a support (that may be held directly against the second object at the lateral position at which the sonotrode acts, or that may be constituted by a framework of a more complex object that holds the second object; such complex framework may for example be a body of an item to be assembled, such as a car body). Optionally, a protection pad may be placed between the sonotrode and the respective object, for example to avoid that the sonotrode causes an impression on the respective object.

A distal face of the sonotrode, in particular the distal face that is in contact with the respective object or the protection pad, can comprise a shape that is adapted to said respective object and/or to the positons of the profile bodies. For example, the proximal face can be ring-like comprising an opening for portions of the respective object that project away from the bonding area.

In the sub-group of embodiments, in which the second object comprises a thermoplastic material too, at least one profile body comprises a proximal profile body head and a distal profile body portion.

In this sub-group of embodiments, the method comprises the steps of:

positioning the distal profile body portion relative to a proximal surface of the second object, in particular bringing the distal profile body portion in contact with the proximal surface of the second object at the position at which the profile body shall be embedded in the first and second objects.

pushing the distal profile body portion through the second object into the thermoplastic material of the first object until the profile body head is flush with the proximal surface of the second object Applications of the approaches according to the invention are for example in the automotive or aviation industry or other industries focusing on lightweight materials. In embodiments boding a first object to a second object, the second object may for example be a part of an automobile body and wherein the first object may be a specific automobile part to be bonded to the automobile body.

For example, the first object can be a part of the automobile body comprising an external surface of the automobile wherein the second object comprises a sensor, for example a parking sensor, that has to be bonded from a rear side of the external surface close to said external surface.

The liquefaction of the flow portion may be primarily caused by friction between the vibrating object and the surface of the respective other object, which friction heats the object that has the thermoplastic material superficially, at least.

In this text the expression "thermoplastic material being capable of being made flowable e.g. by mechanical vibration" or in short "liquefiable thermoplastic material" or "liquefiable material" or "thermoplastic" is used for describing a material comprising at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process. Especially, since the profile body may have a relatively small extension in the proximodistal direction and since therefore the method is also suitable for fixing a relatively thin first or second object to the second or first object (including the possibility of both objects being thin), the approach of the invention may also work for thermoplastic materials that are poor vibration conductors, such as thermoplastic materials with a low modulus of elasticity and/or with elastomeric properties. This is especially the case since the shape of the profile body may ensure that the contact with the respective object is essentially line-shaped. This has a high energy concentrating effect, making a local liquefaction possible even if the thermoplastic material has strong damping properties.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably comprises a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally comprise a polymeric component that is not cross-linked covalently or cross-linked in a manner that the cross-linking bonds open reversibly upon heating to or above a melting temperature range. The polymer material may further comprise a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the first object is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, non-liquefiable material may be a metal, such as aluminium or steel, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride (PVC), polyethylene, polypropylene, and polystyrene, or copolymers or mixtures of these.

In embodiments in which both, the first and the second object comprise thermoplastic material and no welding is desired, the material pairing is chosen such that the melting temperature of the second object material is substantially higher than the melting temperature of the first object material, for example higher by at least 50°. Suitable material pairings are for example polycarbonate or PBT for the first object and PEEK for the second object.

In addition to the thermoplastic polymer, the thermoplastic material may also comprise a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for the method according to the invention has preferably a frequency between 2 and 200 kHz (even more preferably ultrasonic vibration having a frequency between 10 and 100 kHz, or between 20 and 40 kHz) and a vibration energy of 0.2 to 20 W per square millimeter of active surface. The vibrating tool (sonotrode) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side is the "foot portion".

Hereinafter, embodiments of the invention are described referring to drawings. The drawings are all schematical and not to scale. In the drawings, same reference numbers refer to same or analogous elements. The drawings are used to explain the invention and embodiments thereof and are not meant to restrict the scope of the invention.

Terms designating the orientation like "proximal", "distal", etc. are used in the same way for all embodiments and drawings.

The drawings show:

FIG. 1 a bonding method, three initial configurations of a first object, a second object and a plurality of profile bodies, and the first and second objects bonded by the bonding method;

FIG. 2 a bonding method, wherein the second object comprises the profile bodies and wherein the second object comprises a stress release structure for reducing internal stress;

FIG. 3 a variation of the second object used in the method according to FIG. 2 comprising a further means for stress release;

FIG. 4 a possible arrangement of the plurality of profile bodies;

FIG. 5 another possible arrangement of the plurality of profile bodies in combination with a shape of the object that is correspondingly adapted for stress release;

FIG. 6 yet another possible arrangement of the plurality of profile bodies in combination with a shape of the object that is correspondingly adapted for stress release;

FIGS. 7-11 cross-sectional views of exemplary profile bodies;

FIG. 12 an exemplary profile body comprising holes for anchoring;

FIG. 13 another exemplary profile body comprising an undercut;

FIG. 14 yet another exemplary profile body comprising an undercut;

FIG. 15 a cross-sectional view of the profile body;

FIG. 16 another bonding method comprising a twisted profile body;

FIG. 17 a bonding method, wherein the second object comprises a reservoir for accommodating thermoplastic material that is displaced during embedding of the profile body;

FIGS. 18-19 a bonding method, wherein the second object comprises a compensation region for profile body deformation;

FIG. 20 a bonding method comprising a profile body with a proximal profile body head and a distal profile body portion;

FIG. 21 objects bonded by a method comprising the profile body with the proximal profile body head and the distal profile body portion, and the second object comprising the reservoir and the compensation region;

FIGS. 22*a-b* a profile body embedded in the first and second object, wherein the profile body comprises a support surface for limiting the embedding in the first and second object;

FIGS. 23*a-b* two exemplary embodiments of profile bodies comprising the support surface;

FIGS. 24-27 various exemplary embodiments of profile bodies comprising the support surface FIG. 28 a bonding method, wherein the profile bodies are integral with the second object;

FIG. 29 a bonding method, wherein the profile bodies are integral with the second object and wherein the second object comprises a reservoir;

FIG. 30 an exemplary application of any embodiment of the bonding method using any embodiment of the profile bodies;

FIGS. 31-32 objects bonded by a method comprising profile bodies with a base element and an adhesive;

FIGS. 33-34 two exemplary embodiments of profile bodies comprising the base element;

FIGS. 35-36 the profile bodies according to FIGS. 33 and 34 after bonding of the first and second object;

FIGS. 37-39 further exemplary embodiments of profile bodies comprising the base element;

FIG. 40 a bonding method that provides a seal;

FIGS. 41-42 a bonding method comprising profile bodies with a base element and an object having a reservoir for accommodating thermoplastic material that is displaced during embedding of the profile bodies; and FIGS. 43-45 further exemplary embodiments of profile bodies comprising the base element.

A method according to the invention comprises providing a first object 1, providing a second object 2 and providing a plurality of profile bodies 3. On the left, FIG. 1 shows three initial configurations of the first object 1, the second object 2 and the plurality of profile bodies 3 provided.

In a first configuration, the first object 1, the second object 2 and the profile bodies 3 are separate parts.

In a second configuration, the second object 2 comprises the profile bodies 3, wherein it is the first object 1 into which as less stress as possible is to be induced. In particular, it is the first object 1 that comprises a so-called A-surface 8 that is visible after bonding of the first and second object and that should not deform.

However, the second configuration can result from the first configuration by a method comprising the step of embedding the profile bodies 3 that are initially separate from the first and second object in the second object 2.

In a third configuration, the second object 2 comprises the profile bodies 3, wherein it is the second object 2 into which as less stress as possible is to be induced. In particular, it is the second object 2 that comprises the A-surface 8 that is visible after bonding of the first and second object and that should not deform.

Again, the third configuration can result from the first configuration by a method comprising the step of embedding the profile bodies 3 that are initially separate from the first and second object in the second object 2.

Embodiments of the method other than the one shown in FIG. 1 can provide the first object 1, the second object 2 and the plurality of profile bodies 3 in one or more of the above mentioned configurations. For example, the embodiments shown in FIGS. 19 and 20 can provide the first object 1, the second object 2 and the profile bodies 3 in the first or second configuration.

In the embodiment shown in FIG. 1, both the first and second object comprise a thermoplastic material. However, a second object 2 that comprises a thermoplastic material is an optional feature of the invention. FIGS. 28 and 29 show embodiments, in which the second object 2 does not comprise thermoplastic material.

The profile bodies 3 shown in FIG. 1 have the shape of a sleeve comprising a (longitudinal) axis 19.

Independent of the initial configuration, the profile bodies 3 comprise a first profile body portion 3.1 with a first undercut 4.1 and a first opening 16.1.

For bonding of the first and second object, the axis 19 is oriented normal to a surface portion of the first object 1 (in the following called the first object surface portion 30) and a surface portion of the second object 2 (in the following called the second object surface portion 31), wherein the first object surface portion 30 lies against the second object surface portion 31 after bonding of the first and second object.

The first profile body portion 3.1 with the first undercut 4.1 and the first opening 16.1 are oriented towards the first object surface portion 30 before the profile bodies 3, in particular their first profile body portion 3.1 are embedded in the first object 1.

The profile bodies 3 can further comprise a second profile body portion 3.2 with a second undercut 4.2 and a second opening 16.2. In particular, this is the case in the first configuration shown in FIG. 1, this means in embodiments comprising profile bodies 3 that are separate from the first and second object and comprising a second object 2 that comprises thermoplastic material, or—more general—in embodiments, in which the profile bodies 3, in particular their second profile body portion 3.2, are embedded in the second object 2 during bonding the first object 1 to the second object 2.

The profile bodies 3 can comprise a thoroughgoing opening from the first opening 16.1 to the second opening 16.2.

The second profile body portion 3.2 with the second undercut 4.2 and the second opening 16.2 are oriented towards the second object surface portion 31 before the profile bodies 3, in particular their second profile body portions 3.2 are embedded in the second object 2.

On the right of FIG. 1, the bonded first and second objects are shown as they result from any of the three configurations after the step of embedding the profile bodies 3 in the first object 1 and possibly in the second object 2.

The profile bodies 3 are embedded by the use of a sonotrode 9 that is pressed against a coupling surface 32 of either the first or the second object.

In the embodiment shown, mechanical energy and pressure are applied by the use of the sonotrode 9 for a time sufficient to embed the profile bodies 3 so far into the first and possibly the second object that the first object surface portion 30 lies against the second object surface portion 31.

In embodiments of the method in which the second object 2 comprises thermoplastic material too, the method can comprise a step in which thermoplastic material of the first object 1 and thermoplastic material of the second object 2 interpenetrate such that a weld is formed between said thermoplastic materials after re-solidification of the thermoplastic materials. Said step can take place after the step of embedding the profile bodies.

For example, a separate weld is formed next to each profile body 3. In particular, a weld may run around each profile body 3 in a continuous, i.e. non-interrupted, manner such that it forms a seal.

Further, the weld does not need to be weight-bearing or fixing due to the presence of the profile bodies 3. Hence, the weld can be a weld that is restricted to a small volume, in particular a small volume running around each profile body 3. Consequently, the weld can be done with no or little additional energy input with respect to the energy input generated by the mechanical energy and/or pressure applied in the step of embedding the profile bodies. Further, contributions of such a weld and/or its generation to the deformation of the first and/or second object as well as to a resistance against a movement of the first object 1 relative to the second object 2 are essentially negligible.

FIG. 2 shows an embodiment of the bonding method that starts from the second configuration. In this embodiment, the second object 2 comprises a stress release structure being a region 6.1 that is thinner than regions in which the profile bodies 3 are attached.

The thinned region 6.1 lies between the regions in which the profile bodies 3 are attached.

The regions in which the profile bodies 3 are attached have a thickness such that the profile bodies 3 do not penetrate a surface that is opposite to the second object surface portion 31. In the embodiment shown, the surface opposite to the second object surface portion 31 corresponds to the coupling surface 32.

The sonotrode 9 comprises a coupling face 33 adapted to the shape of the second object 2. In particular, the regions in which the profile bodies 3 are attached are in contact to the sonotrode 9, only.

The second object 2 shown in FIG. 3 comprises a further stress release structure being a waved portion 6.2. The waved portion 6.2 is equipped to deform in case of stress that is internal to the second object 2. By doing so, the second object 2 can more easily compensate deformations of the second object 2 relative to the first object 1 and vice versa. Such relative deformations generate stress in the first and second objects via the profile bodies 3 when not compensated. Hence, the waved portion 6.2 is a further means to release stress and to make sure the A-surface 8 is not deformed, for example.

In the embodiment shown, the waved portion 6.2 is arranged in the thinned region 6.1.

FIGS. 4-6 show exemplary arrangements of the profile bodies 3 and exemplary shapes of second objects 2.

FIG. 4 shows a second object 2 having a cross-sectional shape in a plane parallel to the second object surface portion 31 that is round. The profile bodies 3 are distributed equidistantly, wherein the distance A between two neighbouring profile bodies 3 is significantly larger than a diameter D of the profile bodies (or their corresponding extension perpendicular to the axis 19).

In many applications, the distance A is 2 to 10 fold the diameter D (or their corresponding extension perpendicular to the axis 19), in particular 3 to 8 fold or 4 to 6 fold the diameter D. The distance A can be 0.7 to 0.1 of an extension of the second object 2 along a direction of the two objects defining the distance A between two neighbouring profile bodies 3, for example.

For example, the diameter D of the profile bodies 3 is between 1 and 10 mm, in particular between 2 and 8 mm or between 3 and 6 mm.

The distance A between two neighbouring profile bodies 3 is for example between 10 and 50 mm, in particular between 10 and 30 mm or between 15 and 25 mm. The latter is in particular the case for a second object 2 having an extension along the direction of the two objects defining the distance A between two neighbouring profile bodies 3 of around 40 to 50 mm.

The diameter D of the profile bodies 3 and the distance A between two neighbouring profile bodies 3 depend on various parameters, such as the size of the objects to be bond, the area in which the bonding takes place and/or the needed strength of the bonding.

The second object 2 of FIG. 4 comprises a housing 7 that protrudes from a surface portion that is opposite to the second object surface portion 31 and that is arranged such that is does not overlap with any position of the profile bodies 3.

The housing 7 can comprise wires or a feedthrough, for example. Hence, second objects 2 as shown in FIG. 4 can be used as connectors for supplying power, signals, a liquid or a gas, for example.

Depending on the application and the space at hand for mounting, the cross-sectional shape of the second object 2 can have any other geometric shape, such as rectangular or elliptic.

In the embodiment of FIG. 5 the cross-sectional shape of the second object 2 is adapted to the positions of the profile bodies 3. Bonding takes place on portions of the second object 2 that protrudes from a central part of the second object 2. The central part comprises the housing 7, for example.

In order to release stress caused by a movement of the second object 2 relative to the first object 2 and vice versa, the protrusions comprise a narrowed portion 6.3 between the positions of the profile bodies 3 on said protrusions and the central region.

Finally, FIG. 6 shows an embodiment that is in particular suitable for large-scale bonding and multi-point fixation.

In the embodiment shown in FIG. 6, the second object 2 forms a 2-dimensional, regular grid around the central part comprising the housing 7, for example.

The profile bodies 3 are positioned at grid crossings. Portions of the grid that lie between grid crossings can be narrowed portions 6.3, again.

FIGS. 7-11 show the profile bodies 3 in cross-sectional views perpendicular to the axis 19 of the profile bodies 3. The profile bodies 3 shown are equipped to deform elastically in reaction to a force applying from a direction that is perpendicular to their axis 19. Such forces are generated by first and second objects that deform or move relative to each other. Hence, the use of profile bodies 3 that are capable to deform elastically along a direction perpendicular to their axis 19 contribute to release stress in the first and second objects generated by said relative deformation or movement.

In particular in embodiments of the method in which the second object 2 comprises thermoplastic material, the embodiments shown in FIGS. 7-11 can comprise a support surface 14 as shown in FIGS. 22-27, for example. The support portion 14 can be arranged on a median plane of the profile body 3, i.e. on a plane that is perpendicular to the axis 19 and that intersects the axis 19 in the middle between a proximal end and a distal end of the profile body 3.

In the embodiment shown in FIG. 7, the profile body 3 has a thoroughgoing opening from the first opening 16.1 to the second opening 16.2 and a cross-section that is open, i.e. discontinuous, for example spiral.

In the embodiment shown in FIG. 8, the profile body 3 has the thoroughgoing opening, too. However, the cross-sectional shape of the profile body 3 is the shape of an open ring.

FIG. 9 shows an embodiment of the profile body 3 that is elastically deformable in reaction to the force applying from a direction that is perpendicular to the axis 19 but that has a closed cross-sectional shape.

The exemplary shape of a tri-lobed profile body 3 is shown in FIG. 9. However, other cross-sectional shapes, such as shapes comprising waves, can be envisaged.

FIGS. 7, 8, 10 and 11 show examples of cross-sectional shapes that corresponds to open loops, whereas

Embodiments of the profile bodies 3 according to the FIGS. 7-11 have wall thicknesses configure to not prevent the profile bodies 3 from elastical deformation in reaction to the force applying from a direction that is perpendicular to the axis 19.

In particular, the profile bodies are made of a sheet metal.

A positive fit connection can be used in order to anchor the profile bodies 3 in the first object 1 and possibly in the second object 2 in a reliable manner. FIGS. 12-15 show exemplary embodiments of profile bodies comprising means contributing to a positive fit connection when embedded in thermoplastic material.

Figure 1:
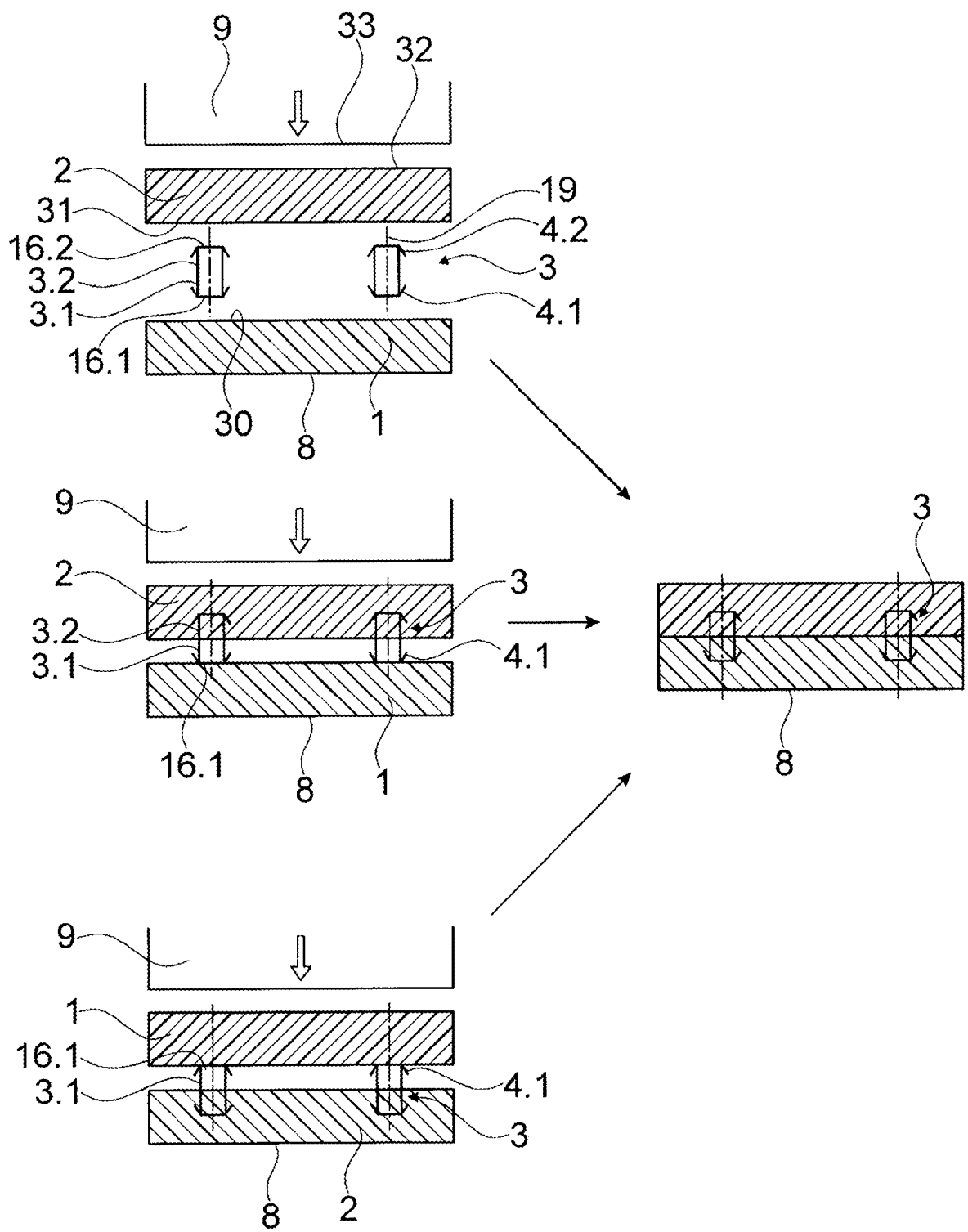
Figure 2:
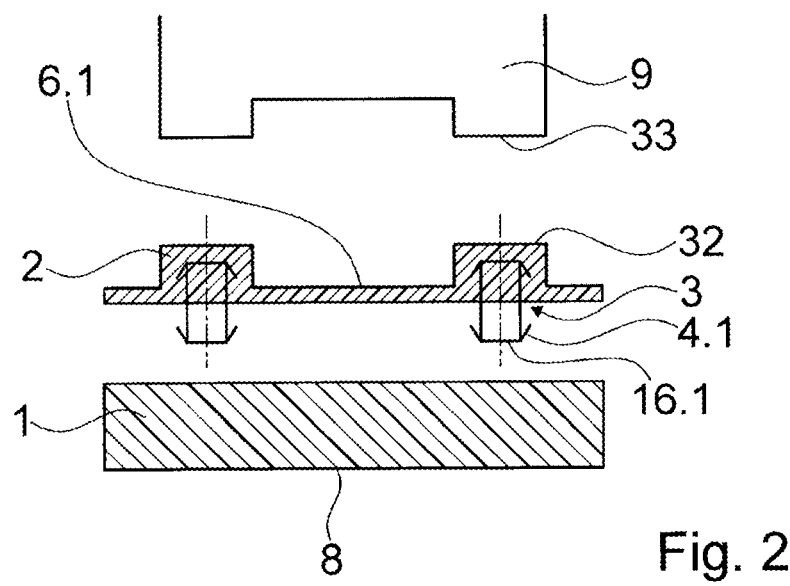
Figure 3:
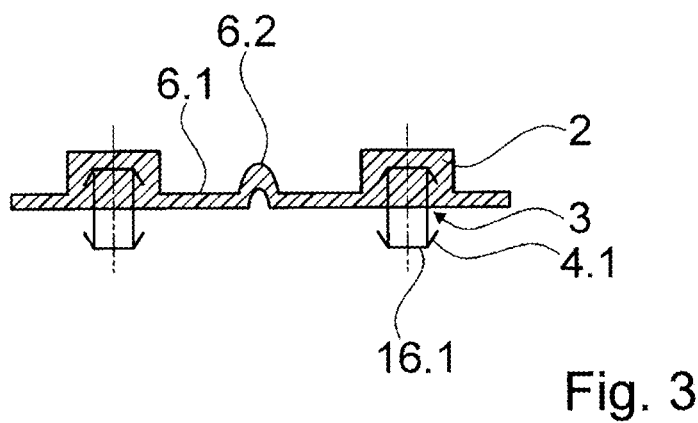
Figure 4:
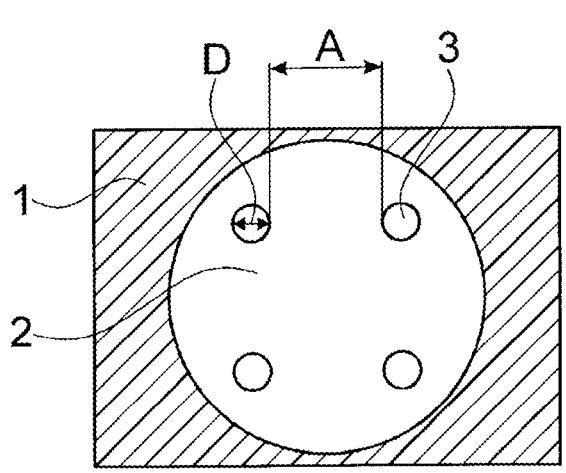
Figure 5:
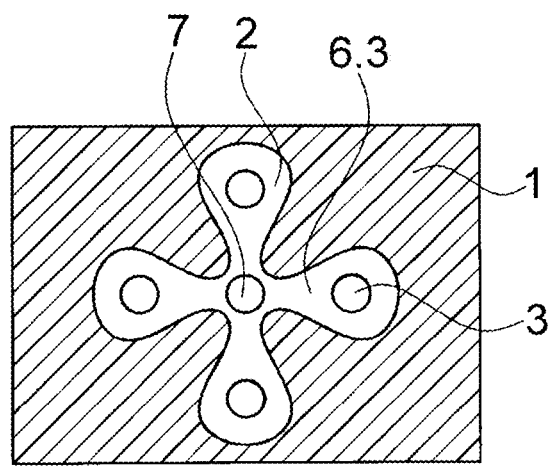
Figure 6:
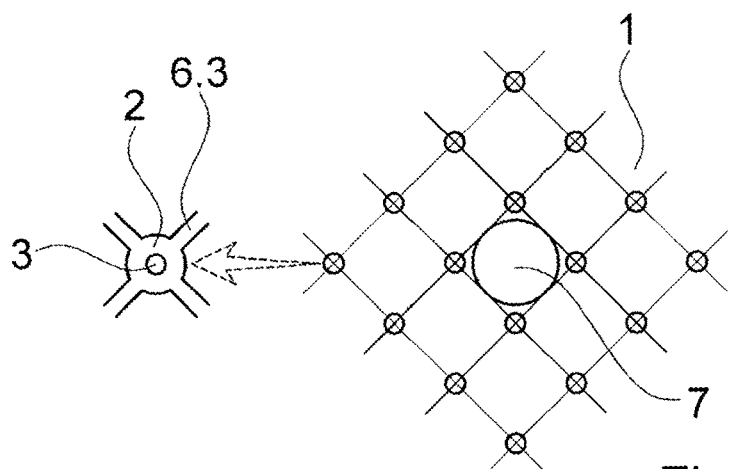
Figure 7:
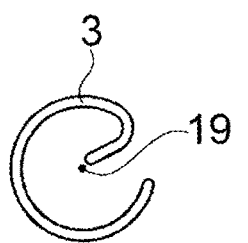
Figure 8:
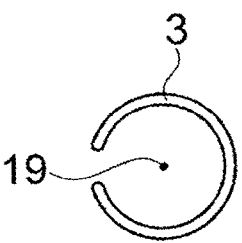
Figure 9:
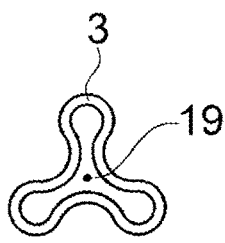
FIG. 9 shows an example of a closed loop.
Figure 10:
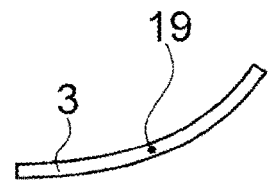
FIG. 10 shows an embodiment of the profile body 3 that has the shape of a bent line in a cross-section perpendicular to the axis 19.
Figure 11:
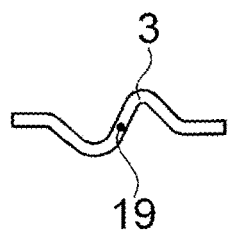
FIG. 11 shows an embodiment of the profile body 3 that has the shape of a corrugated line in a cross-section perpendicular to the axis 19.
Figure 12:
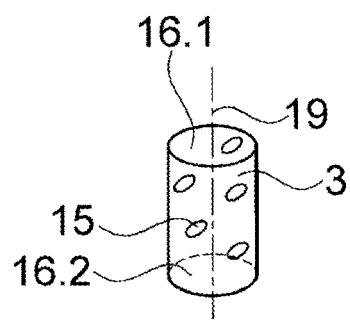

FIG. 12 shows a profile body 3 comprising holes 15 in the wall of the profile body 3. In particular, the holes extend radially from the axis 19 of the profile body 3.

Figure 13:
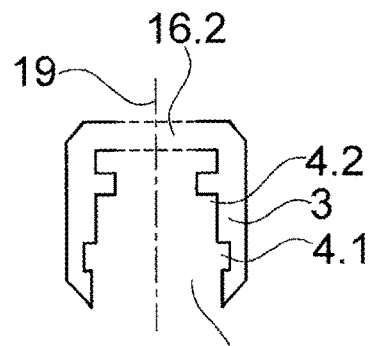

FIG. 13 shows a cross-section of a profile body 3, said cross-section being along the axis 19 of the profile body 19.

The profile body 3 shown has a first undercut 4.1 in the region of the first opening 16.1 and a second optional undercut 4.2 in the region of the optional second opening 16.2.

The undercuts are arranged on an inside surface of the profile body 3.

Figure 14:
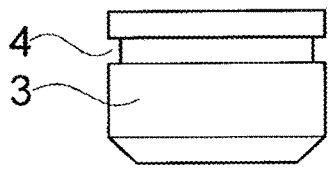

FIG. 14 shows a profile body 3 with an undercut 4 that is arranged on an outer surface of the profile body 3.

Figure 15:
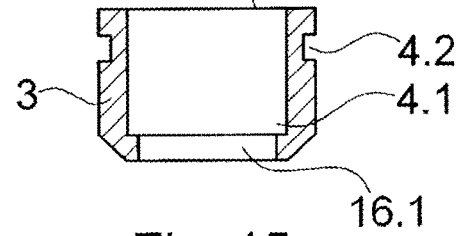

FIG. 15 shows a cross-section of a profile body 3 with the undercut arranged on the outer surface of the profile body 3, for example the profile body 3 shown in FIG. 14. Said cross-section is a cross section along the axis 19 of the profile body 19.

The profile body 3 shown comprises the first undercut 4.1 in the inside of the profile body 3 in the region of the first opening 16.1 and the second undercut 4.2 at the outer surface of the profile body 3 in the region of the second opening 16.2.

Figure 16:
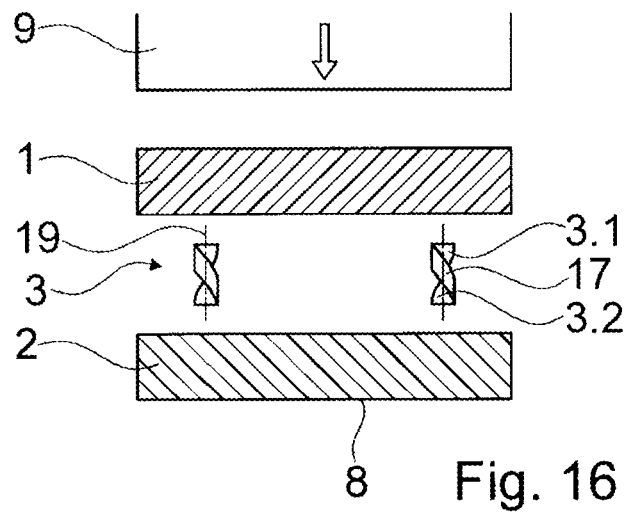

FIG. 16 shows an embodiment of the method comprising a profile body 3 that forms a twist 17. The twist 17 is a structure that is capable to form a positive fit connection with the first object 1 after embedding. Hence, there is no need for an undercut.

In the embodiment shown, the profile body 3 is a twisted rod that extends along the axis 19. Hence, the second body portion 3.2 can be embedded in the second object 2 by applying pressure and mechanical energy too if the second object 2 comprises thermoplastic material.

However, it is also possible that the first profile body portion is twisted, only.

In a variation of the embodiment shown in FIG. 16, the first profile body portion 3.1 is at an angle to the second profile body portion 3.2, in particular at a right angle. The second profile body portion 3.2 can be twisted or attached in a different manner to the second object 2.

In particular, the first profile body portion 3.1 comprises the twist 17, wherein the non-twisted second profile body portion 3.2 is attached in recesses of the second object surface portion 31. In other words, the profile body does not penetrate into the second object 2, deeply.

In another variation of the embodiment shown in FIG. 16, the first and the second profile body portions are twisted and aligned along the axis 19. However, the axis 19 is oriented parallel to the first and second object surface portions.

Figure 17:
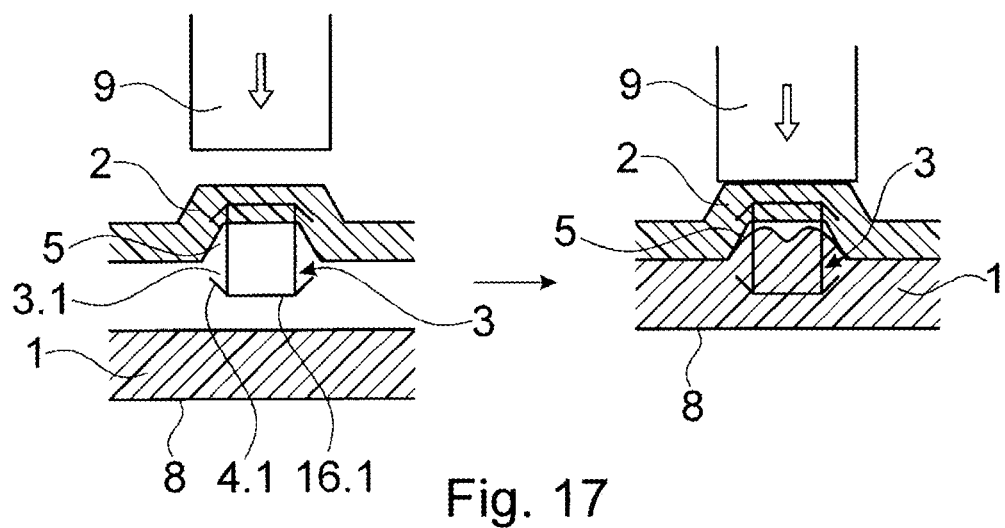

FIG. 17 shows a bonding method that starts from the second configuration, i.e. the second object 2 comprises profile bodies 3. However, attaching, for example embedding, the profile bodies 3 to the second object 2 can be a further step of the bonding method prior to embedding the profile bodies 3 in the first object 1.

The second object surface portion 31 comprises an indentation projecting away from the second object surface portion 31 towards the portions of the second object 2 where the profile bodies 3 are attached. Said indentation forms a reservoir 5 arranged to accommodate thermoplastic material of the first object 1 that is displaced during embedding of the profile body 3, in particular of the first profile body portion 3.1, in the first object 1.

The mechanical energy and pressure applied by the sonotrode 9 and coupled into the second object 2 and the profile body 3 leads to softening or liquefaction of the thermoplastic material of the first object 1 that is restricted to a very local region around an area of the first object 1 in which a distal end of the profile body 3 is in contact to the first object 1.

Hence, the reservoir 5 is arranged next to the profile body 3. Its shape can be adapted to the displacement of the thermoplastic material of the first object 1. In particular, the reservoir 5 can narrow from the second object surface portion 31 to a proximal direction, in particular to the positon where the profile body is attached to the second object 2.

Figure 18:
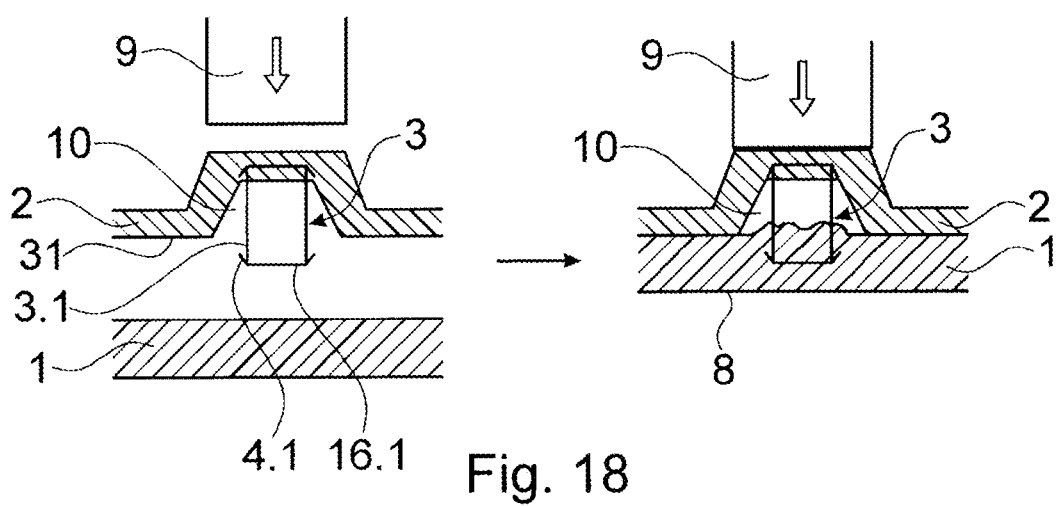

FIG. 18 shows a further bonding method that starts from the second configuration, i.e. the second object 2 comprises profile bodies 3. However, attaching, for example embedding, the profile bodies 3 to the second object 2 can be a further step of the bonding method prior to embedding the profile bodies 3 in the first object 1.

Similar to the embodiment shown in FIG. 17, the second object surface portion 31 comprises an indentation projecting away from the second object surface portion 31 towards the portions of the second object 2 where the profile bodies 3 are attached. However, said indentation is dimensioned such that it forms a compensation region 10, this means a region that generates a void around a portion of the profile body 3 after bonding of the first and second objects and after the possible displacement of thermoplastic material into the compensation region 10 during the step of embedding the first profile body portion 3.1 in the first object 1.

The compensation region 10 is dimensioned such that the portion of the profile body 3 that is in the void after bonding of the first and second objects comprises a length such that the profile body 3 can follow the relative movements and deformations of the first and second objects by an elastical deformation of the portion of the profile body 3 that is in the void after bonding.

In particular, the volume of the void is more than 0.5 fold the volume of the thermoplastic material that is displaced during the step of embedding the first profile body portion 3.1 in the first object 1. For example, the volume of the void is larger than the volume of the thermoplastic material that is displaced or 1 to 3 fold the volume of the thermoplastic material that is displaced.

Hence, the volume of the compensation region 10 (i.e. before embedding the first profile body portion 3.1 in the first object 1) is more than 1.5 fold, for example more than 2 fold or 2 to 4 fold of the volume of the thermoplastic material that is displaced.

Further, an extension of the compensation region 10 parallel to the first object surface portion 30 is more than 1.2 fold, in particular more than 2 fold, the corresponding maximal extension of the profile body 3. In particular, said extension is more than 1.2 fold, in particular more than 2 fold, the maximal radial (with respect to the axis 19 of the profile body 3) extension of the first profile body portion 3.1.

In a preferred embodiment of the method shown in FIG. 18, the profile body 3 comprises a shape equipped for elastical deformation in in reaction to a force applying from a direction that is perpendicular to their axis 19. For example, the profile body 3 comprises a shape as shown in FIGS. 7-11.

Figure 19:
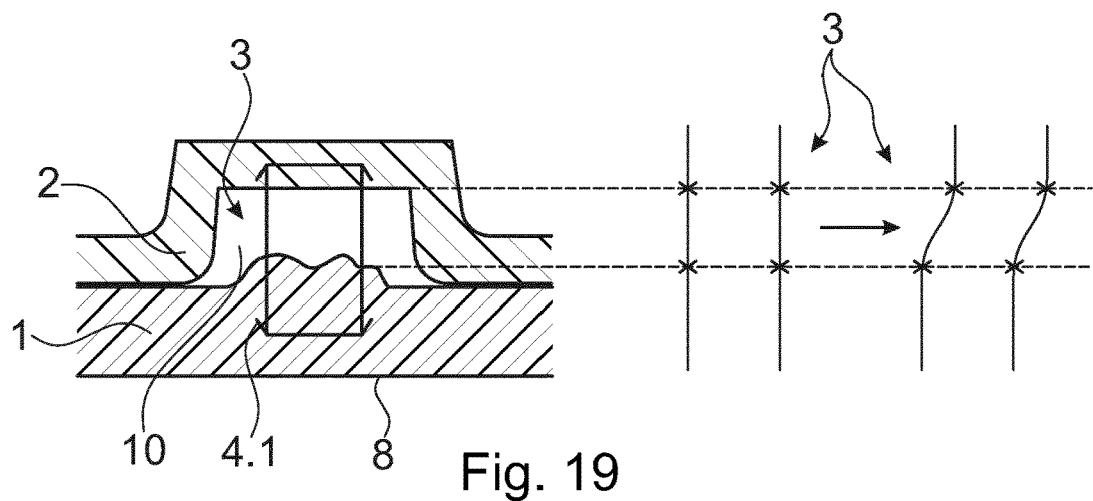

FIG. 19 shows the functional principle of embodiments comprising a compensation region 10 using the example of a deformation region 10 that is formed differently compared to the embodiment shown in FIG. 18.

The profile body 3 can be considered as comprising a portion embedded in the first object 1 (in particular the first profile body portion 3.1), a portion attached to the second object 2 (in particular the second profile body portion 3.2) and a not embedded portion between the two said portions that lies in the void formed by the compensation region 10.

If the second object 2 moves relative to the first object 1, the profile body 3 generates a reduced resistance against the movement and hence stress around the portions of the first and second objects where the profile bodies are embedded or attached is reduced compared to embodiments without compensation region 10.

The stress generated around the said portions of the first and second objects depends on the length of the not embedded portion and elasticity of the not embedded portion perpendicular to the axis 19 of the profile body 3.

Figure 20:
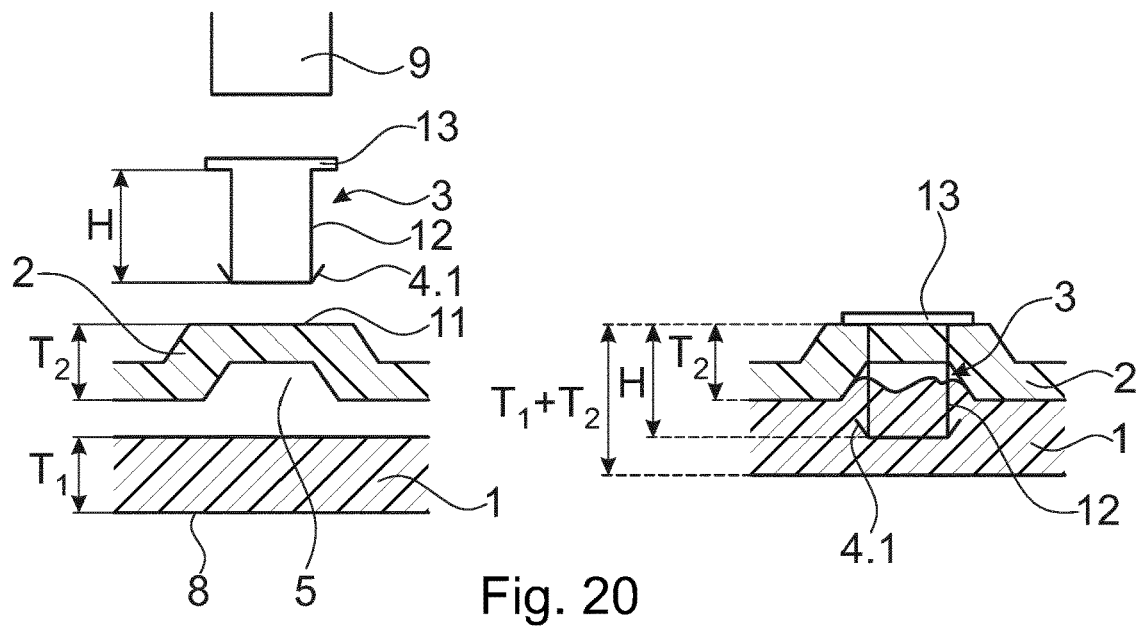

FIG. 20 shows an embodiment of the bonding method in which the profile body 3 comprises a proximal profile body head 13 and profile body portion 12 that is distal of the proximal profile body head 13.

The profile body 3 has an overall height H from the proximal profile body head 13 to a distal end of the profile body portion 12 that is larger than the thickness T2 of the second object 2 (including a potentially present reservoirs 5 and/or compensation region 10) but smaller than a combined thickness of T2 with a thickness T1 of the first object 1.

The profile body 3 is equipped to penetrate the second object 2.

In the embodiment shown in FIG. 20, the profile body 3 is positioned relative to a proximal surface 11 of the second object 2 such that the profile body 3 is next to a joining location of the second object 2.

The sonotrode 9 pushes the profile body 3 through the second object 2 and causes embedding of the distal profile body portion 12 by applying pressure and mechanical energy to the profile body head 13.

The application of pressure and mechanical energy is stopped or reduced as soon as the profile body head 13 is flush with a proximal surface of the joining location. A reduction of the pressure and/or mechanical energy to a level not sufficient for further embedding can improve the quality of the bond. In particular, it can prevent the formation of gaps between the first and second objects.

The difference between the height H of the profile body 3 and the thickness T2 of the second object 2 is such that the distal profile body portion 12 penetrates sufficiently deep into the first object to guarantee a reliable bonding. In particular, the undercut 4.1 of the profile body 3 is embedded in the first object completely.

In the embodiment shown, the second object 2 comprises thermoplastic material. However, this is an optional feature. In embodiments according to FIG. 20, there is need that the distal profile body portion 12 is able to penetrate the second object 2. This need can be met for second objects 2 comprising or consisting of various materials, possibly with distal profile body portion 12 adapted according, for example by being pointed.

Figure 21:
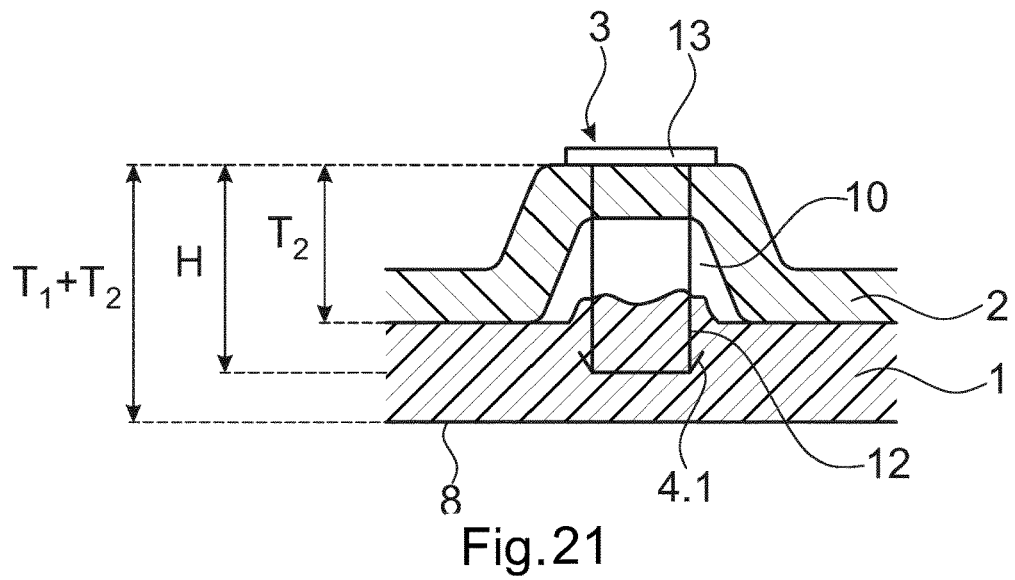

FIG. 21 shows a variation of the embodiment according to FIG. 20, wherein the second object comprises the compensation region 10 and wherein the profile body has a height considering the increased thickness T2 of the second object 2 at the joining location due to the compensation region 10.

In embodiment in which the first profile body portion 3.1 is embedded in the first object 1 and the second profile body portion 3.2 is embedded in the second object 2, i.e. in embodiments according to the first configuration, the problem of insufficient embedding in the first or second object can appear. This is the result of a softening or liquefaction of the thermoplastic material in contact with the first profile body portion 3.1 relative to the softening or liquefaction of the thermoplastic material in contact with the second profile body portion 3.2 caused by unequal energy input, for example.

This problem can be solved by the use of a support surface 14 as shown in FIGS. 22-27, for example. The support surface 14 is a surface of the profile body 3 that runs at least partly parallel to the first object surface portion 30 and at least partly parallel to the second object surface portion 31 during embedding. Hence, the area of the profile body 3 in contact with the first object surface portion 30 or the second object surface portion 31 increases as soon as the according surface portion gets in contact with the support surface 14. This prevents the profile body from being further embedded as the amount of thermoplastic material that needs to be softened for further embedding increases, whereas the energy coupled into the thermoplastic material is constant.

The support surface 14 can form a closed volume, which increases resistance against further embedding once the volume is filled, too.

Figure 22A:
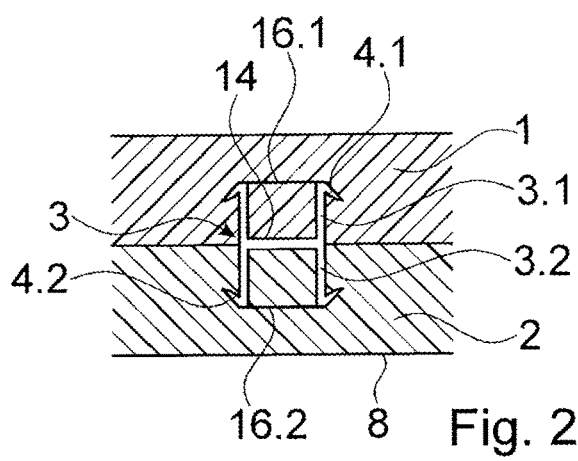

FIG. 22a shows an exemplary embodiment of a profile body 3 comprising the support surface 14 after embedding the profile body 3 in the first and second objects.

The profile body is in the shape of a sleeve and the support surface 14 is arranged in the inside the sleeve such that the sleeve comprises two compartments, wherein a first compartment is accessible through the first opening 16.1 and a second compartment is accessible through the second opening 16.2, only.

Figure 22B:
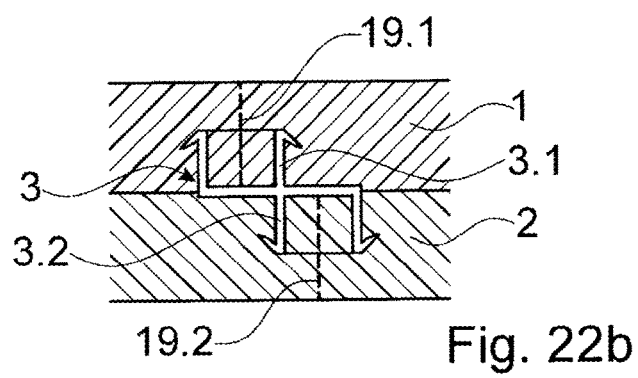

FIG. 22b shows the profile body 3 of FIG. 22a, wherein the first profile body portion 3.1 comprises a first axis 19.1 and the second profile body portion 3.2 comprises a second axis 19.2 that is offset relative to the first axis 19.1.

FIGS. 23-27 show further exemplary embodiments of profile bodies 3 comprising a support surface 14.

Figure 23A:
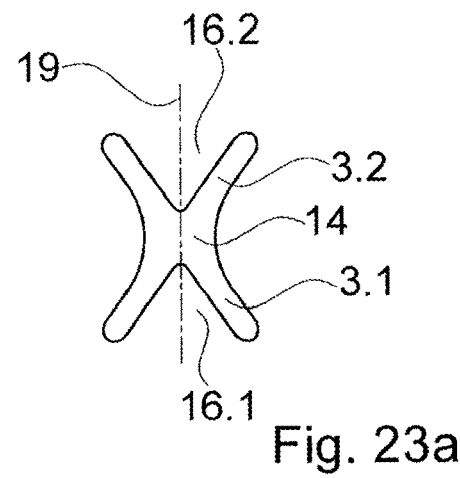
Figure 23B:
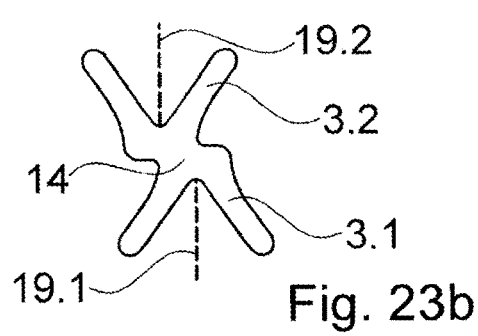
Figure 24:
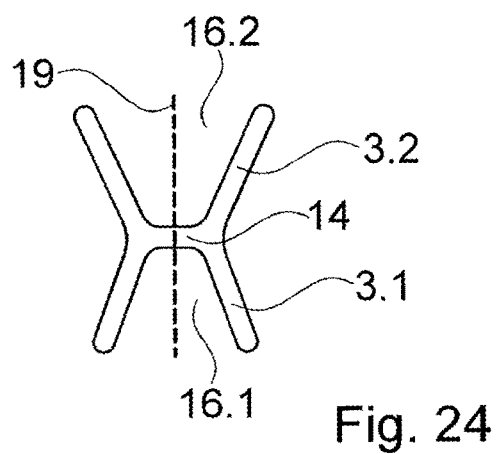

The embodiments according to FIGS. 23a-b and 24 comprise an "X"-like cross-sectional shape parallel to the axis 19. Both embodiments do not comprise rotational symmetry around the axis 19, but comprise a translational symmetry along an axis normal to the plane shown.

FIG. 23b shows the profile body of FIG. 23a with offset axes.

One can envisage to design the profile bodies in general with offset axes. In particular, one can envisage to design the profile bodies according to FIGS. 24-27, but also according to FIGS. 7-19, with offset axes.

Figure 25:
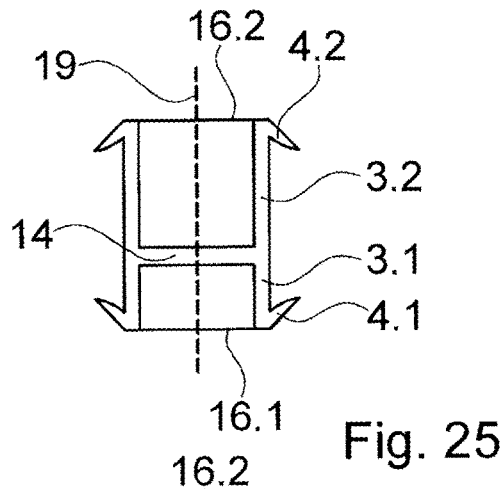

The embodiment according to FIG. 25 is similar to the embodiment shown in FIG. 22. However, the support surface 14 is shifted towards the first opening 16.1 in order to adjust the depth of embedding in the first and second object.

Figure 26:
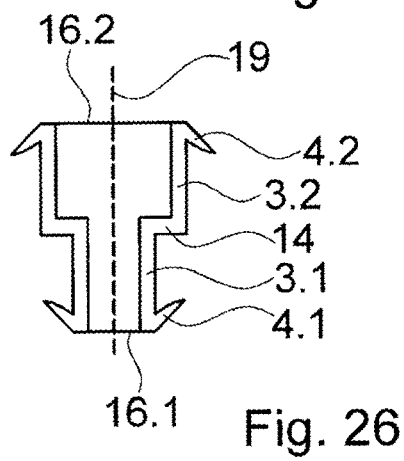

In the embodiment according to FIG. 26, the support surface is realized by a changing diameter of the profile body 3. For example, the diameter of a sleeve-like profile body 3 increases in a step from a first diameter of the first profile body portion 3.1 to a second diameter of the second profile body portion 3.2 or vice versa.

The profile body 3 according to FIG. 26 comprises a support surface 14 that is in the inside of the profile body 3 for one of the objects to be bonded and that is on the outside of the profile body 3 for the other objet to be bonded.

Figure 27:
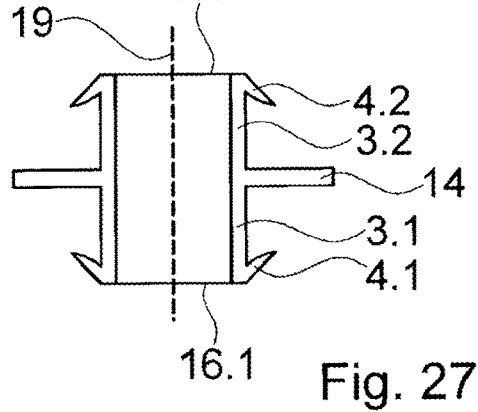

FIG. 27 shows an embodiment of the profile body 3 comprising the support surface 14, wherein the support surface 14 is a protrusion of the profile body 3 that is arranged on the outer surface of the profile body and extends radially from the axis 19.

Again, the position of the support surface 14 can be adapted in order to adjust the depth of embedding in the first and second object.

Figure 28:
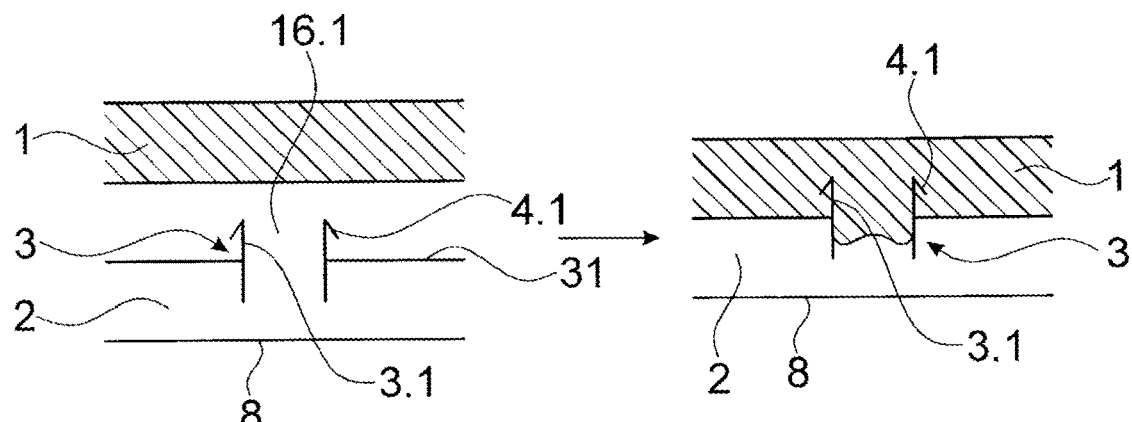

FIG. 28 discloses an embodiment of the bonding method, in which the profile bodies 3 are an integral part of the second object 2.

For example, the profile bodies 3 and the second object 2 are formed from and/or as a single element. However, the profile bodies 3 can be attached, for example glued or welded, to the second object 2.

The first profile body portion 3.1 protrudes from the second object surface portion 31. The first profile body portion 3.1 comprises the first undercut 4.1 and the first opening 16.1.

The protruding first profile body portion 3.1 forms a cavity into which the thermoplastic material of the first object 1 can penetrate during embedding of the profile body 3 in the first object 1.

In the embodiment shown, the second object 2 comprises the A-surface 8. However, the method will work if the first object 1 comprises the A-surface 8, too.

Figure 29:
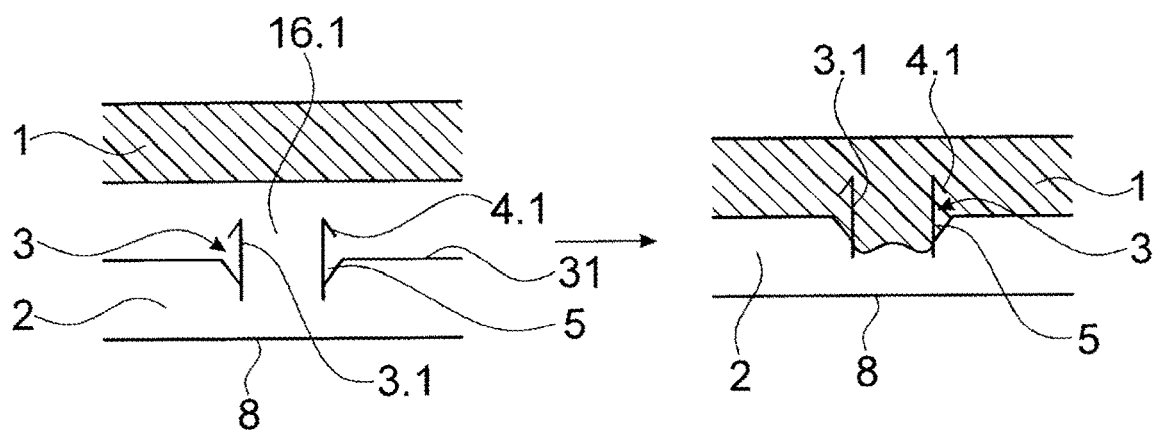

FIG. 29 shows a variation of the embodiment shown in FIG. 28, wherein the second object 2 further comprises a reservoir 5 next to protruding profile body 3. Hence, thermoplastic material of the first object 1 can be accommodated in both, the cavity formed by the profile body 3 and the reservoir 5. This reduces pressure points and hence stress in the first and second objects further.

Figure 30:
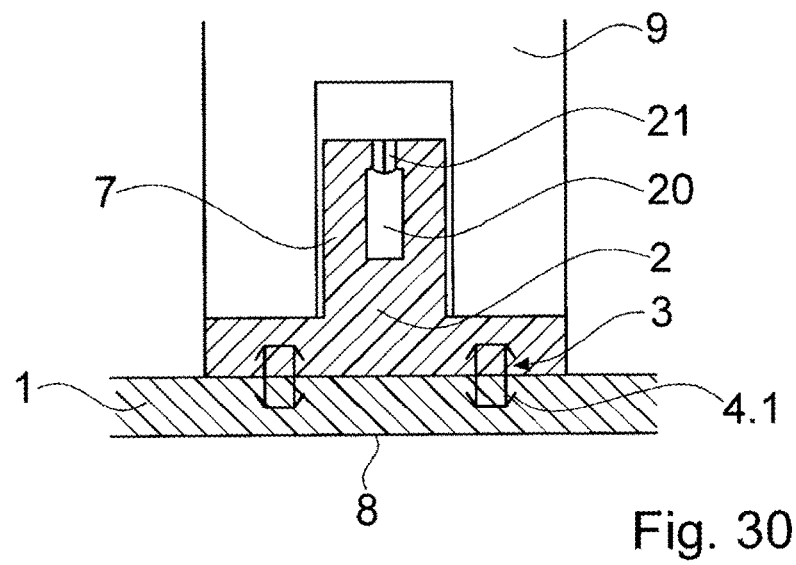

FIG. 30 shows an exemplary application of any embodiment shown comprising any profile body shown.

The application concerns the fixation of a sensor 20, for example a sensor 20 used for automobiles, such as a parking sensor.

The sensor 20 is part of the second object 2 that forms a connector comprising openings for wires 21.

The first object 1 to which the connector is bonded is for example an automobile part comprising a surface that is part of the visible outer surface of the automobile. In other words, the automobile part comprises A-surface 8.

Figure 31:
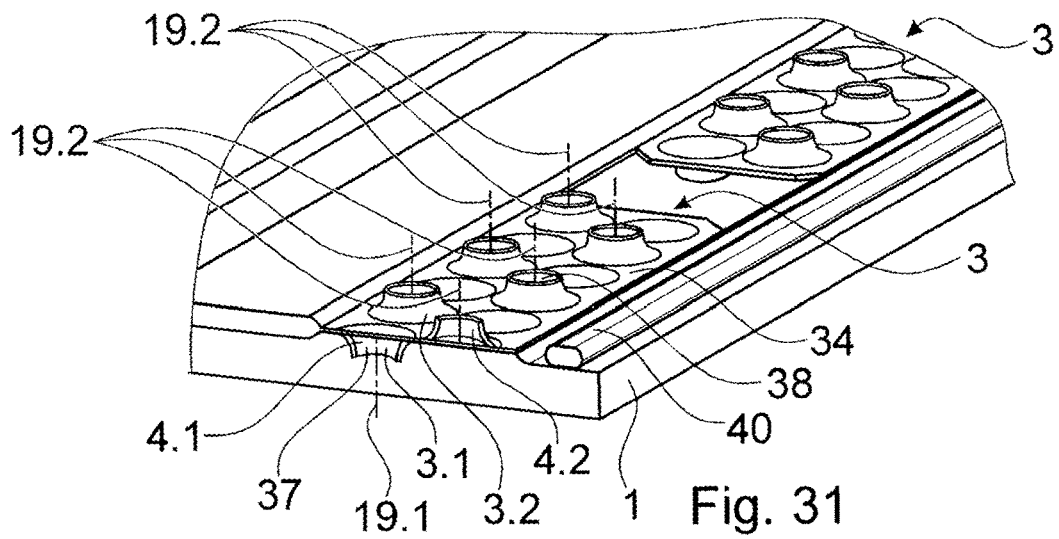

FIG. 31 shows an exemplary embodiment of the second object 2 bonded to the first object 1 by profile bodies 3 that comprise a base element 34 and by an adhesive 40. The second object 2 is drawn in a transparent manner in order to show the profile bodies 3 and the adhesive 40 arranged between the first and second object in more detail.

Figure 32:
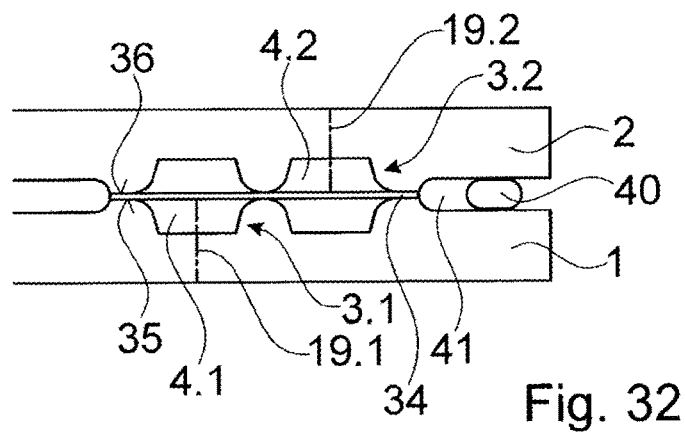

FIG. 32 represents a cross-sectional view of FIG. 31.

The profile bodies 3 comprise the first profile body portions 3.1 and the second profile body portions 3.2. First and second profile body portions are arranged on opposite sides of the base element 34, namely on the first surface 35 and the second surface 36.

The first profile body portions 3.1 protrude from the base element 34 along the first axis 19.1 and the second profile body portions 3.2 protrude from the base element 34 along the second axis 19.2.

The embodiment according to FIG. 31 shows the optional feature of a set of first axes 19.1 that is offset from a set of second axes 19.2 along the plane defined by the base element 34, the optional feature of first and the second axes that run perpendicular to the plane defined by the base element 34, and the optional feature of first axes 19.1 that are parallel to each other and of second axes 19.2 that are parallel to each other.

The second object 2 of the embodiment shown in FIGS. 31 and 32 (and also in FIGS. 35 and 36) comprises thermoplastic material. Hence, the second profile body portions 3.2 are embedded in the second object 2.

The embodiment shown in FIG. 31 comprises the optional feature of the first profile body portion 3.1 forming a first undercut 4.1 by its shape that forms a first cavity 37 that has a diameter that decreases along the first axis 19.1 when starting from the base element 34 (from the first surface 35). It also comprises the optional feature of the second profile body portion 3.2 forming a second undercut 4.2 by its shape that forms a second cavity 38 that has a diameter that decreases along the second axis 19.2 when starting from the base element 34 (from the second surface 36).

The first and second object according to FIGS. 31 and 32 are shaped such that an adhesive gap 41 is formed during bonding the first object 1 to the second object 2. For this purpose, the first object 1 comprises a recess in the first object surface portion 30 (i.e. the surface portion arranged towards the second object 2 during/after bonding) and/or the second object 2 comprises a recess in the second object surface portion 31 (i.e. the surface portion arranged towards the first object 1 during/after bonding).

The size of the adhesive gap 41, this means the distance between the first and second object in the region of the adhesive 40 after bonding, is given by the depth(s) of the recess(es) and the thickness of the base element.

The profile bodies 3 are arranged in a manner that they do not extend into said recess(es) prior to the step of embedding the profile bodies 3.

In a step of arranging the first object 1, the second object 2, the profile bodies 3 and the adhesive 40, said step being prior to the step of embedding the profile bodies 3, the adhesive 40 is arranged in a recess or on a surface portion of the first or second object, said recess or surface portion forming part of the adhesive gap 41 during/after bonding the first object 1 to the second object 2.

However, one can also envisage to arrange and/or pre-assemble the adhesive 40 with the profile bodies 3 and optionally with one of the objects. In particular, the adhesive 40 can be arranged in contact with the first or second profile body portions. In this embodiment, the profile body portions in contact with the adhesive 40 penetrate the adhesive 40 during the step of embedding the profile bodies 3, at least.

Figure 33:
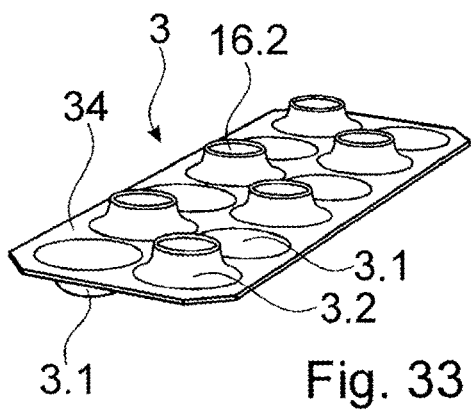
Figure 34:
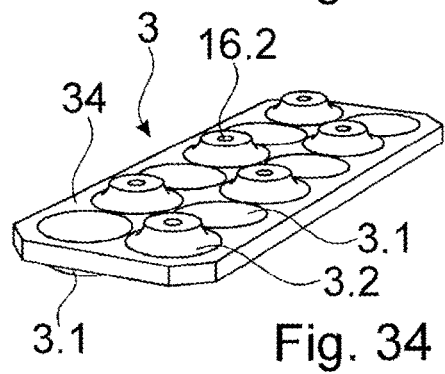

FIGS. 33 and 34 show two further embodiments comprising the base element 34 and causing the establishment of an adhesive gap 40 during bonding the first object 1 to the second object 2.

In the embodiment according to FIG. 33, it is the shape of the first and second profile body portions, optionally in combination with the mechanical properties of the adhesive 40 that determines the size of the adhesive gap 41, this means the distance between the first and second object in the region of the adhesive 40 after bonding.

In particular, an outer diameter of the first profile body portion 3.1 increases along the first axis 19.1 when starting from the first opening 16.1 and an outer diameter of the second profile body portion 3.2 increases along the second axis 19.2 when starting from the second opening 16.2. However, one can also envisage that either the first profile body portion 3.1 or the second profile body portion 3.2 is shaped in this manner and that the base element 34 forms a support surface 14.

Figure 35:
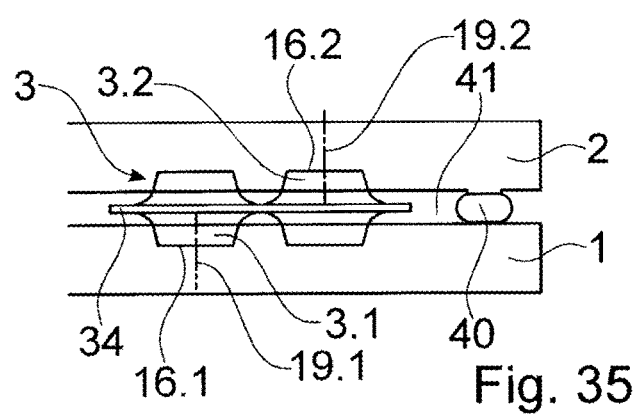

FIG. 35 shows a cross-sectional view of the profile body 3 according to FIG. 33 after bonding the first and second object.

In the embodiment according to FIG. 34, base element 34 forms a spacer. For this purpose, the base element comprises a thickness that corresponds to the adhesive gap size needed, this means the desired distance between the first and second object after bonding.

Figure 36:
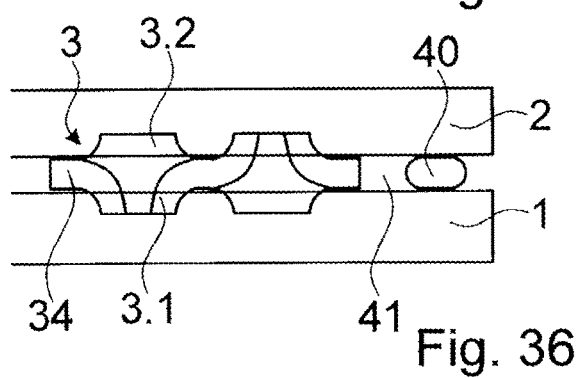

FIG. 36 shows a cross-sectional view of the profile body 3 according to FIG. 34 after bonding the first and second object.

The dimensions of the profile bodies 3, in particular the profile bodies comprising a base element 34, can be adapted to at least one of the shape of the first and/or second object, and further elements present in or mounted to the first and/or second object. Feedthroughs, cables, mounts, sensors etc. are examples of such further elements. In particular, the dimensions can be adapted to the resulting space that is available for fixation.

Alternatively or in addition, the arrangement of first and second profile body portions can be adapted to at least one of the shape of the first and/or second object, and further elements present in or mounted to the first and/or second object.

Figure 37:
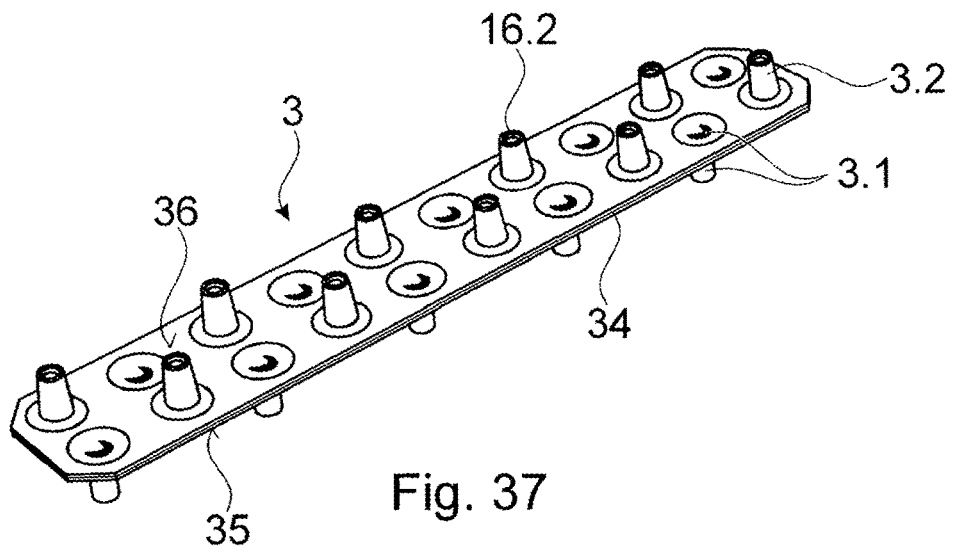
Figure 38:
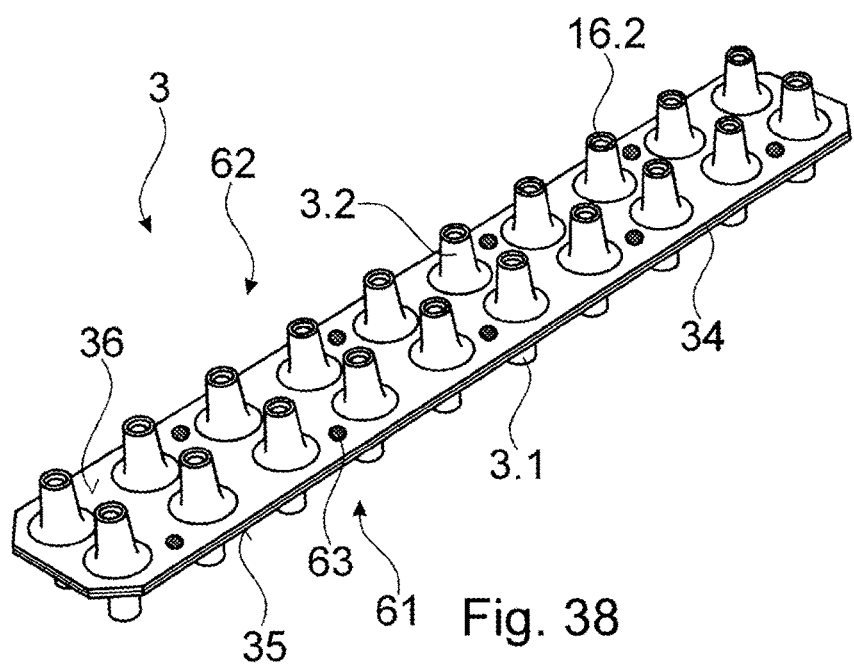
Figure 39:
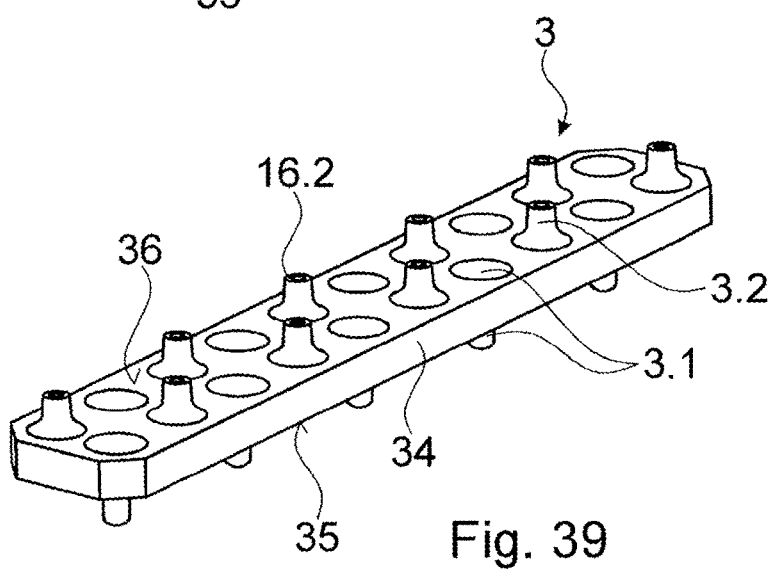

FIGS. 37-39 show further exemplary embodiments of profile bodies comprising a base element 34 that differ from the embodiments shown in FIGS. 31-36 in their design, in particular in their dimensions and in the arrangement of the first and second profile body portions.

First profile body portions 3.1 that are offset from the second profile body portions 3.2 as shown in FIGS. 31-37 and 39 are advantageous for production of the profile bodies 3. The profile body portions can be punched (stamped) from the base element 34 when the first and second profile body portions are to be arranged in this way.

However, production methods such as 3D printing, injection molding, folding of a semi-finished profile body comprising profile body portions on one outer surface only or bonding two semi-finished profile bodies of this kind along a surface not comprising the profile body portions allow for first profile body portions 3.1 that protrude from areas on the first surface 35 and second profile body portions 3.2 that protrude from areas on the second surface 36, wherein a projection of the areas on the first surface 35 overlaps the areas on the second surface 36 and vice versa. FIG. 38 shows an exemplary embodiment of such an arrangement of first and second profile body portions.

Such an arrangement of first and second profile body portions can be advantageous in terms of mechanical stability of the bonded first and second object, for example.

In the embodiment of FIG. 38, such an arrangement of first and second profile body portions is established by a profile body 3 comprising a first profile body part 61 and a second profile body part 62.

The first profile body part 61 comprises profile body portions on one side only and the second profile body part 62 comprises profile body portions on one side only.

A side opposite to the side comprising the profile body portions does not comprise any profile body portions on both profile body parts. However, said sides not comprising the profile body portions are adapted to each other such that the first and second part can abut along said sides and fixed in the abutting relative position.

In the embodiment shown, the fixation of the first and second part is done by welding (welding spots 63).

In the embodiment of FIG. 38, the first and second profile body part are metal sheets, wherein the profile body portions are punched out of the metal sheets.

Further, the embodiment shown in FIGS. 37-39 differ from the embodiments shown in FIGS. 31-36 in the thickness of the base element 34. By doing so, the size of the adhesive gap 41 and/or the mechanical stability, in particular the rigidity or bending properties, of the profile body 3 can be determined.

The embodiments shown are plane and non-curved. However, one can also envisage to design the profile bodies 3, in particular the base element 34, non-plane and or curved.

Figure 40:
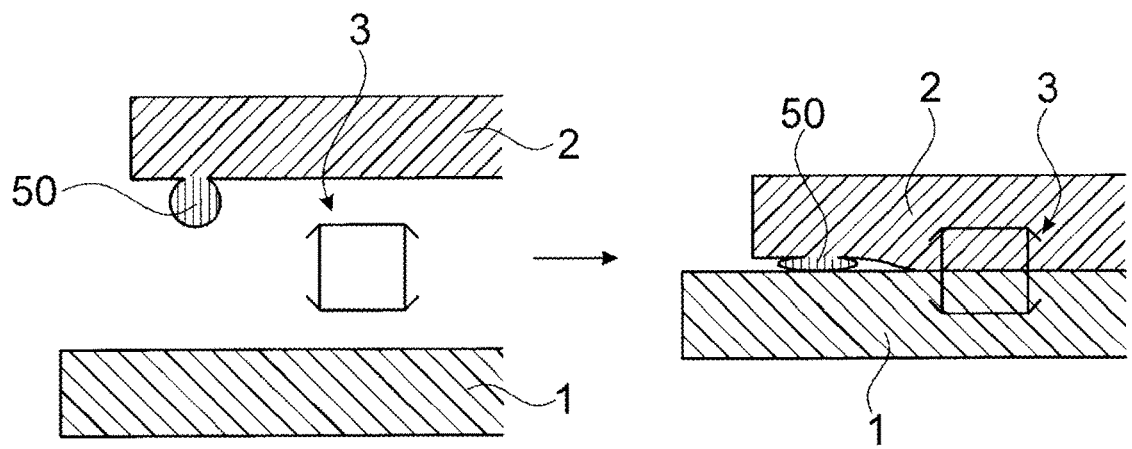

FIG. 40 shows the main elements of a bonding method that seals a region between the bonded first and second objects. The elements are shown in a cross-sectional view before (left side of the Figure) and after (right side of the Figure) bonding.

For this purpose, one of the objects, for example the second object 2, comprises an elastomeric portion 50 that is arranged in a manner that it is compressed between the first and second object during and after bonding. The compressed elastomeric portion 50 seals a region on one side of the elastomeric portion 50 from a region on another side of the elastomeric portion 50.

The elastomeric portion 50 can have a closed form such that a region encircled by the elastomeric portion 50 is sealed from an outside region. For example, this allows the mounting of elements that are adversely affected by wet and/or moisture in the region encircled by the elastomeric portion 50 or the reaching of such elements in or through said region.

The profile bodies 3 can be arranged in the encircled region or the outside region.

One can also envisage a separate seal element instead of the elastomeric portion 50.

Figure 41:
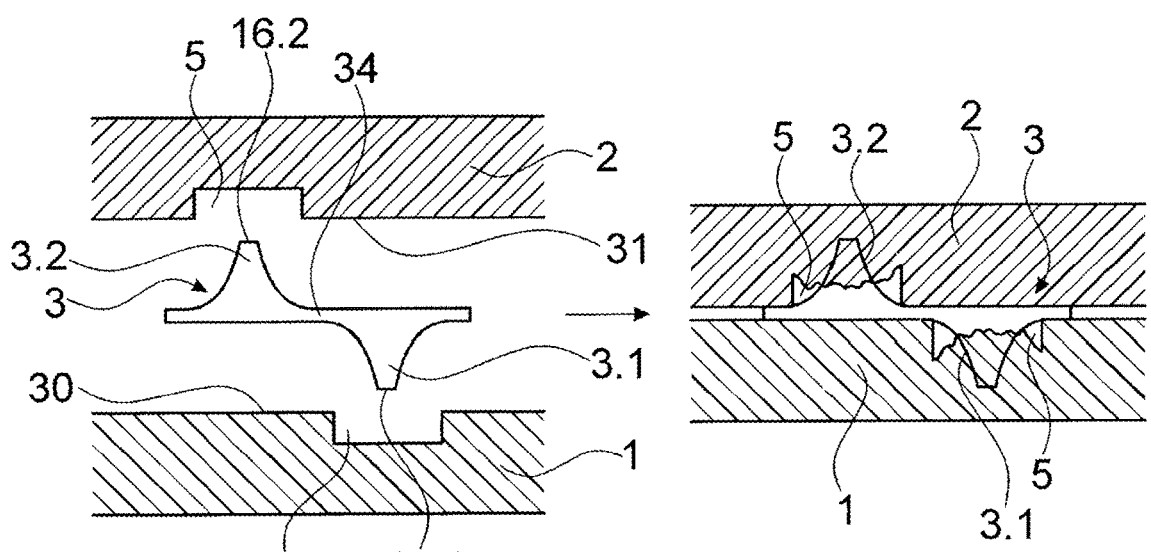

FIG. 41 shows an embodiment of the method in which profile bodies 3 with a base element 34 and a plurality of profile body portions (3.1 and 3.2) are combined with reservoirs 5 that are arranged such that thermoplastic material that is displaced during the step of embedding the profile bodies 3 in the first object 1 and/or during the step of embedding the profile bodies 3 in the first object 1 and in the second object 2 is accommodated in the reservoirs 5.

For this purpose, reservoirs 5 are arranged on the first object 1 and—as the case may be—on the second object 2 in a manner adapted to the arrangement of profile body portions.

The profile body portions shown comprise openings (16.1 and 16.2) such that the thermoplastic material can penetrate into cavities formed by the profile body portions.

In the embodiment shown, undercuts (4.1 and 4.2) are formed by the shape of the cavities.

Figure 42:
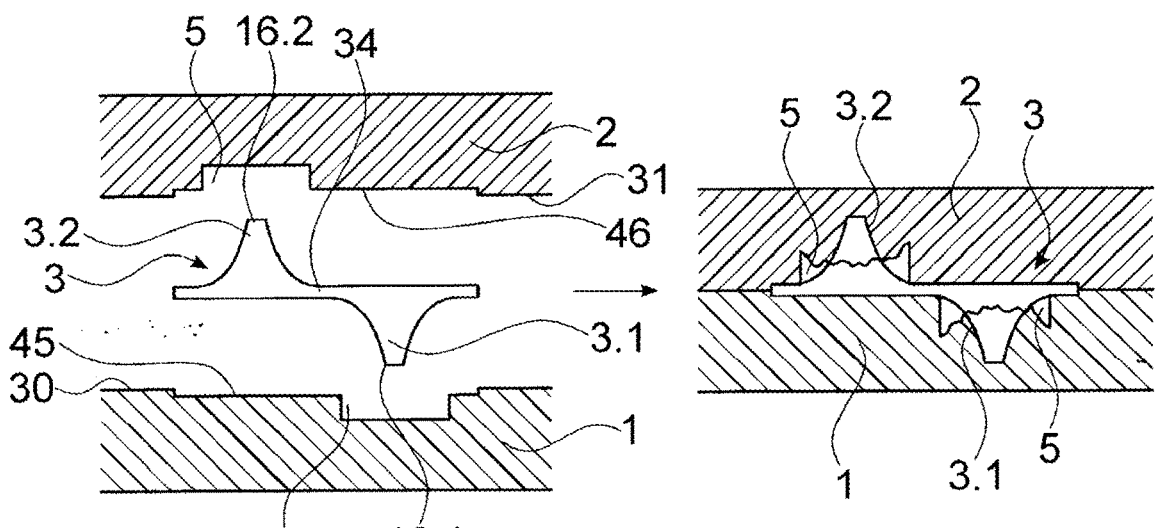

The embodiment of FIG. 42 shows the optional feature of a surface opening for accommodating the base element 34.

In the embodiment shown, the first object 1 comprises a first surface opening 45 forming a recess with a depth that corresponds to half of the thickness of the base element 34 at least and the second object 2 comprises a second surface opening 46 forming a recess with a depth that corresponds to half of the thickness of the base element 34 at least.

One can also envisage other depths of the first and second surface opening to accommodate the base element 34. For example, the base element 34 can be accommodate predominantly in one of the two surface openings. Alternatively, there can be either the first surface opening 45 or the second surface opening 46, wherein the surface opening has a depth corresponding to the thickness of the base element 34, at least.

Embodiments according to FIG. 42 result in a gap-free bonding of the first object 1 to the second object 2, wherein embodiments according to FIG. 41 result in a gap, for example an adhesive gap 41 between the first and second object.

Figure 43:
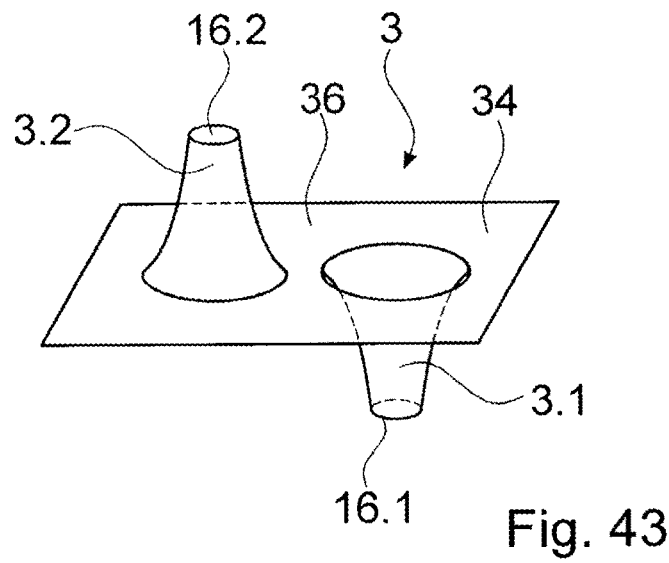

FIG. 43 shows a basic configuration of the profile body 3 comprising one first profile body portion 3.1 on the first surface 35 (not visible in FIG. 43) and one second profile body portion 3.2 on the second surface 36, wherein the second profile body portion 3.2 is offset from the first profile body portion 3.1.

Such a basic configuration can be sufficient for a broad variety of applications. However, the stability of the bonding between the first object 1 and the second object 2 generated by profile bodies 3 in the basic configuration may not be sufficient if forces apply in use that pull the objects apart, for example if a force apply on one of the objects that generates a significant component perpendicular to the first and second object surface portions (35 and 36) while the other object is mounted such that it cannot move in a direction perpendicular to the first and second object surface portion. This insufficient stability is the result of a (turning) moment generated on the profile body 3. The moment can cause a deformation of the base element 34, in particular a deformation of the region between the two profile body portions.

In particular, the issue of insufficient mechanical stability can be present if the profile bodies are made of a sheet metal.

A first approach to overcome the issue of insufficient mechanical stability of profile bodies 3 in the basic configuration is to choose a material that makes the profile bodies more stable and/or to make the base element 34 thicker. However, this approach may not be appropriate in terms of production costs.

A second approach to overcome the issue of insufficient mechanical stability of profile bodies 3 in the basic configuration is to reduce the distance between the profile body portions and/or to strengthen the region between the two profile body portions, for example by ridges and/or struts.

A third approach to overcome the issue of insufficient mechanical stability of profile bodies 3 in the basic configuration is to arrange at least one further profile body portion in a manner that the moment on the base element is reduced. Examples of resulting configurations are shown in FIGS. 44 and 45.

Figure 44:
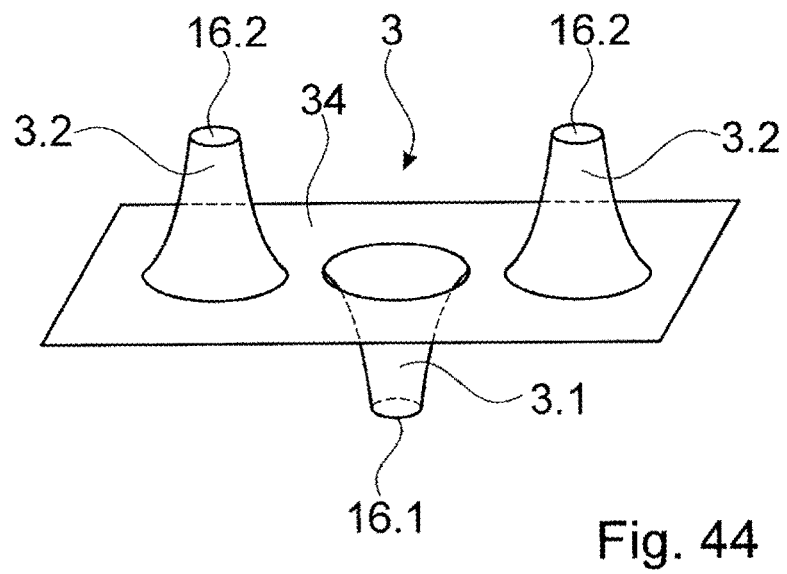

In FIG. 44, a further profile body portion is added in line with the first and second profile body portions of the basic configuration. The further profile body portion is oriented such that the moment on the regions between the profile body portions is reduced. In the embodiment shown, this means that the first and second profile body portions are arranged in an alternating manner along the line.

Figure 45:
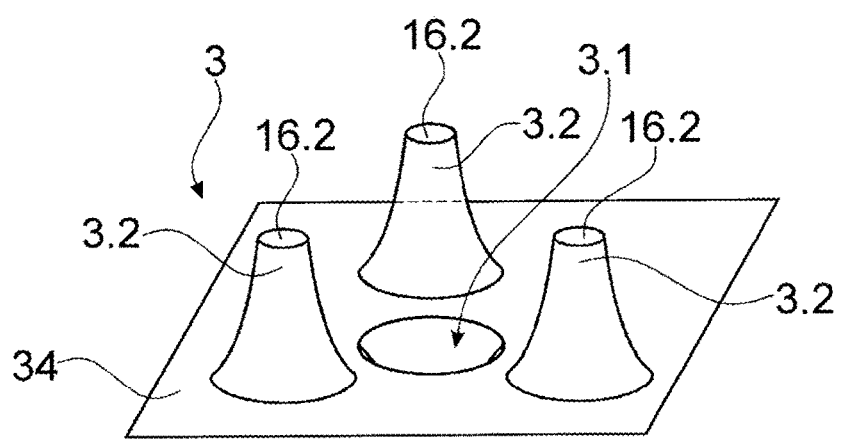

In FIG. 45, a plurality of second profile body portions 3.2 (for example three) is arranged around the location of a first profile body portion 3.1.

The features of at least two of the first, second and third approach can be combined in order to create an even more stable profile body.

All profile bodies 3 shown in the Figures can be used at least in combination with at least one of the adhesive 40, the elastomeric portion 50 (or another sealing element) the reservoir 5, the surface opening (45, 46) or without any of these features.

What is claimed is:

1. A method of bonding a first object to a second object, the method comprising:
providing a profile body, wherein the profile body comprises a first profile body portion,
providing the first object, wherein the first object comprises thermoplastic material,
providing the second object, wherein the profile body is separate from and attachable to the second object or wherein the second object comprises the profile body,
embedding the profile body in the first object such that the first profile body portion is within the thermoplastic material of the first object,
wherein embedding of the profile body in the first object is caused by mechanical energy impinging on the first object and/or on the second object while the first object and the second object are pressed against each other, and
wherein the first object and the second object are not welded directly to each other.

2. The method according to claim 1, wherein at least one of a first depth to which the profile body extends in the first object when embedded in the first object is smaller than a thickness of the first object and of a second depth to which the profile body extends in the second object when attached to the second object is smaller than a thickness of the second object.

3. The method according to claim 1, wherein the profile body is configured such that it is able to deform elastically in reaction to a tension generated by a movement of the first object relative to the second object.

4. The method according to claim 1, wherein at least one of the first object and the second object comprises a stress release structure for reducing internal stress.

5. The method according to claim 1, wherein the profile body is separate from the second object, and the second object comprises thermoplastic material, and wherein the profile body is attached to the second object by the method comprising the further step of embedding the profile body in the second object such that a second profile body portion is within the thermoplastic material of the second object.

6. The method according to claim 5, wherein for being embedded in the first and second object, the profile body is positioned relative to the first and second objects between surface portions of the first and second objects, and wherein the step of embedding the profile body in the first object and the step of embedding the profile body in the second object comprise coupling a pressing force and mechanical vibration energy into at least one of the first and second objects, wherein the pressing force causes the profile body to be clamped between the first and second objects.

7. The method according to claim 5, wherein the profile body comprises a base element from which the first profile body portion and the second profile body portion protrude.

8. The method according to claim 1, wherein a plurality of profile bodies is provided, said profile bodies being separate profile bodies except a possible connection via the second object.

9. The method according to claim 1, wherein the step of providing the second object comprises providing the second object comprising the profile body and wherein the profile body is integral with the second object.

10. The method according to claim 1, wherein at least one of the first object and the second object is provided comprising a reservoir and wherein thermoplastic material that is displaced during the step of embedding the profile body in the first object or during a step of embedding the profile body in the first object and in the second object is accommodated in the reservoir.

11. The method according to claim 1, wherein at least one of the first object and the second object comprises at least one compensation region arranged such that a portion of the profile body embedded in the first object and attached to the second object can deform without being in contact with material of the first and second object and without getting in contact with material of the first and second object.

12. The method according to claim 1, comprising the step of providing an adhesive.

13. The method according to claim 12, wherein an adhesive gap is generated during the method.

14. The method according to claim 1, comprising the step of providing a sealed bonding between the first and second object, wherein the step of proving a sealed bonding comprises providing the first or second object with an elastomeric portion or providing a seal element.

15. The method according to claim 1, wherein the profile body is designed for a localized bonding location.

* * * * *